(12) United States Patent
Harada et al.

(10) Patent No.: US 10,754,083 B2
(45) Date of Patent: Aug. 25, 2020

(54) OPTICAL SHEET FOR BACKLIGHT UNIT AND BACKLIGHT UNIT

(71) Applicant: KEIWA INC., Tokyo (JP)

(72) Inventors: Kenichi Harada, Tokyo (JP); Yoshitada Namikawa, Tokyo (JP); Tadayoshi Fukuda, Tokyo (JP); Yuki Matsuno, Tokyo (JP)

(73) Assignee: Keiwa Inc., Tokyo (JP)

( * ) Notice: Subject to any disclaimer, the term of this patent is extended or adjusted under 35 U.S.C. 154(b) by 39 days.

(21) Appl. No.: 16/061,706

(22) PCT Filed: Dec. 13, 2016

(86) PCT No.: PCT/JP2016/087122
§ 371 (c)(1),
(2) Date: Jun. 13, 2018

(87) PCT Pub. No.: WO2017/104677
PCT Pub. Date: Jun. 22, 2017

(65) Prior Publication Data
US 2018/0364411 A1 Dec. 20, 2018

(30) Foreign Application Priority Data

Dec. 17, 2015 (JP) ................................. 2015-246778
Dec. 13, 2016 (JP) ................................. 2016-240993

(51) Int. Cl.
*F21V 8/00* (2006.01)
*B32B 3/30* (2006.01)
(Continued)

(52) U.S. Cl.
CPC .............. *G02B 6/0051* (2013.01); *B32B 3/30* (2013.01); *B32B 27/08* (2013.01); *B32B 27/36* (2013.01);
(Continued)

(58) Field of Classification Search
CPC .......... B32B 3/30; G02B 6/005; G02B 6/0051
See application file for complete search history.

(56) References Cited

U.S. PATENT DOCUMENTS 7,362,943 B2 * 4/2008 Ouderkirk .............. B82Y 20/00
385/131
7,784,954 B1 * 8/2010 Coleman ................ G02B 5/021
362/19

(Continued)

FOREIGN PATENT DOCUMENTS

CN          103345012 A    10/2013
JP          2002-98810 A    4/2002
(Continued)

OTHER PUBLICATIONS

Machine Translation of JP 2002-098810 (original copy submitted with IDS Jun. 13, 2018) (Year: 2002).*
(Continued)

*Primary Examiner* — Leah Simone Macchiarolo
(74) *Attorney, Agent, or Firm* — Norris McLaughlin, P.A.

(57) ABSTRACT

An optical sheet for a backlight unit for guiding toward a front face side rays of light emitted by an LED light source. The optical sheet includes one or more resin layers. Ultrafine grooves oriented in specific directions are provided on a front face side or a back face side of at least one resin layer of the one or more resin layers. An average number of the ultrafine grooves per unit length in a direction perpendicular to an average orientation of the ultrafine grooves is preferably no less than 10/mm and no greater than 10,000/mm. A face of the at least one resin layer provided with the ultrafine grooves preferably has an arithmetic average roughness (Ra) in a direction perpendicular to an orientation of the ultrafine grooves being no less than 0.01 μm and no greater than 5 μm. Ultrafine grooves preferably constitute a diffraction grating.

10 Claims, 10 Drawing Sheets

(51) Int. Cl.
  *B32B 27/08* (2006.01)
  *B32B 27/36* (2006.01)
  *G02B 1/04* (2006.01)

(52) U.S. Cl.
  CPC ......... *G02B 6/0038* (2013.01); *G02B 6/0061* (2013.01); *B32B 2457/202* (2013.01); *G02B 1/045* (2013.01); *G02B 6/005* (2013.01); *G02B 6/0036* (2013.01); *G02B 6/0081* (2013.01)

(56) References Cited

U.S. PATENT DOCUMENTS

| | | | | |
|---|---|---|---|---|
| 7,991,257 | B1* | 8/2011 | Coleman | B29D 11/0073 264/1.24 |
| 8,111,352 | B2* | 2/2012 | Stalder | G02B 5/0257 345/88 |
| 8,619,363 | B1* | 12/2013 | Coleman | G02B 5/18 359/576 |
| 2004/0234724 | A1* | 11/2004 | Kaminsky | G02B 1/04 428/141 |
| 2014/0286044 | A1* | 9/2014 | Johnson | G02B 5/021 362/607 |
| 2017/0357047 | A1* | 12/2017 | Harada | G02B 6/0053 |

FOREIGN PATENT DOCUMENTS

| | | |
|---|---|---|
| JP | 2003-50306 A | 2/2003 |
| JP | 2005-077448 A | 3/2005 |
| JP | 2009-300989 A | 12/2009 |
| JP | 2012-226290 A | 11/2012 |

OTHER PUBLICATIONS

Machine Translation of JP 2003-050306 (original copy submitted with IDS Jun. 13, 2018) (Year: 2003).*
Machine Translation of JP 2005-077448 (original copy submitted with IDS Jun. 13, 2018) (Year: 2005).*
Machine Translation of JP 2009-300989 (original copy submitted with IDS Jun. 13, 2018) (Year: 2009).*
Machine Translation of JP 2012-226290 (original copy submitted with IDS Jun. 13, 2018) (Year: 2012).*

* cited by examiner

OPTICAL SHEET FOR BACKLIGHT UNIT AND BACKLIGHT UNIT

TECHNICAL FIELD

The present invention relates to an optical sheet for a backlight unit, and a backlight unit.

BACKGROUND ART

Liquid crystal display devices have come into wide use as flat panel displays, taking advantage of their characteristic features such as thinness, lightweight and power saving, and have found an increasingly wide variety of uses for televisions, personal computers, mobile phone terminals such as smartphones, personal digital assistance such as tablet terminals, and the like.

Backlight systems for illuminating a liquid crystal panel from the back face side are in widespread use as a liquid crystal display device, which is equipped with an edge-lit (side-lit) backlight unit, a direct-lit backlight unit or the like. As shown in FIG. 18, an edge-lit backlight unit 101 to be provided in a liquid crystal display device generally includes light sources 102, a light-guiding plate 103 having a rectangular plate-like shape and disposed such that the edge part thereof is aligned with the light sources 102, optical sheets 104 laminated on the front face side of the light-guiding sheet 103, and a reflection sheet 105 disposed on the back face side of the light-guiding sheet 103. The sheets used as the optical sheets 104 include (1) an under-layer light diffusion sheet 106 that is overlaid on the front face side of the light-guiding sheet 103 and primarily has the function of diffusing rays of light, (2) a prism sheet 107 that is overlaid on the front face side of the light diffusion sheet 106 and has the function of reflecting rays of light toward a normal direction, and (3) an upper-layer light diffusion sheet 108 that is overlaid on the front face side of the prism sheet 107 and slightly diffuses rays of light to inhibit the lack in uniformity of luminance caused by, for example, the shapes of protruding prism portions of the prism sheet 107 (see Japanese Unexamined Patent Application, Publication No. 2005-77448).

PRIOR ART DOCUMENT

Patent Document

Patent Document 1: Japanese Unexamined Patent Application, Publication No. 2005-77448

SUMMARY OF THE INVENTION

Problems to be Solved by the Invention

LEDs are commonly used as the light source 102 of the backlight unit 101 from the viewpoint of the size reduction, energy saving, etc. Such a backlight unit including LEDs creates hot spots, a phenomenon where the luminance on the display screen locally increases in the vicinity of the light sources to exhibit variations of light and shade. The hot spots cause a lack in uniformity of luminance of the liquid crystal display device. Although the reason for the lack in uniformity of luminance is not necessarily clarified, it is presumed that the hot spots are created when a conventional light-diffusion sheet, which is for diffusing rays of light, diffuses highly directive rays of light emitted by the LEDs. The lack in uniformity of luminance caused by the hot spots may become more conspicuous due to a reduction in the thickness of the backlight unit, the use of high-luminance LEDs, a decrease in the number of LEDs, an increase in the size of the screen of the liquid crystal display device, and the like.

After a thorough investigation in view of these disadvantages, the present inventors found that providing predetermined ultrafine grooves in optical paths of the backlight unit enabled inhibition of hot spots.

The present invention therefore has been made in view of such circumstances, and has an object to provide an optical sheet for a backlight unit and a backlight unit that are capable of inhibiting the creation of hot spots.

Means for Solving the Problems

An optical sheet for a backlight unit according to one aspect of the present invention made for solving the aforementioned problem is for guiding toward a front face side rays of light emitted by an LED light source. The optical sheet includes one or more resin layers. Ultrafine grooves oriented in specific directions are provided on a front face side or a back face side of at least one resin layer of the one or more resin layers.

In the case where the optical sheet for a backlight unit of the one aspect is included in a backlight unit equipped with LEDs serving as the light sources, the optical sheet is capable of inhibiting the creation of hot spots. Although the reason for this effect is not necessarily clarified, it is presumed that owing to the ultrafine grooves oriented in the specific directions and provided on the at least one resin layer of the optical sheet for a backlight unit of the one aspect, the rays of light passing through regions defined by the ultrafine grooves are transmitted in the width direction of the ultrafine grooves, and thus the inhibition of the creation of hot spots would be enabled even when LEDs that emit highly directive rays of light are employed.

An average number of the ultrafine grooves per unit length in a direction perpendicular to an average orientation of the ultrafine grooves is preferably no less than 10/mm and no greater than 10,000/mm. In the case where the average number of the ultrafine grooves per unit length in the direction perpendicular to the average orientation of the ultrafine grooves falls within the above range, the rays of light passing though the regions defined by the ultrafine grooves are sufficiently diffused in the width direction of the ultrafine grooves, and the inhibition of the creation of hot spots is enabled more reliably.

It is preferred that a face of the at least one resin layer provided with the ultrafine grooves has an arithmetic average roughness (Ra) in a direction perpendicular to an orientation of the ultrafine grooves being no less than 0.01 µm and no greater than 5 µm. In the case where the face of the at least one resin layer provided with the ultrafine grooves has the arithmetic average roughness (Ra) in the direction perpendicular to the orientation of the ultrafine grooves falling within the above range, the creation of hot spots is likely to be inhibited easily and reliably.

It is preferred that the ultrafine grooves constitute a diffraction grating. In the case where the ultrafine grooves constitute the diffraction grating, a diffraction phenomenon occurs, where the rays of light passing through the regions defined by the ultrafine grooves have a certain optical path difference. Owing to the diffraction phenomenon, the creation of hot spots is likely to be inhibited easily and reliably.

It is preferred that the optical sheet of the one aspect is a light diffusion sheet including: a base film; a light diffusion layer that is laminated on a front face side of the base film and contains beads and a binder for the beads; and a protective layer laminated on a back face side of the base film. In the case where the optical sheet of the one aspect is a light diffusion sheet, rays of light diffused substantially uniformly over the entire face thereof are likely to be emitted.

It is preferred that the ultrafine grooves are provided on a back face side of the protective layer. For the backlight unit including the optical sheet for a backlight unit of the one aspect, in the case where the ultrafine grooves are provided on the back face side of the protective layer, the rays of light passing through the regions defined by the ultrafine grooves are likely to be transmitted sufficiently in the width direction of the ultrafine grooves, owing to a difference in refractive index between the protective layer and an air layer present on the back face side of the protective layer.

The optical sheet of the one aspect may include a functional layer having projections and recesses provided on a front face thereof. In the case where the functional layer having projections and recesses on the front face thereof is included, rays of light diffused substantially uniformly over the entire face thereof are likely to be emitted.

It is preferred that one resin layer of the one or more resin layers has ultrafine projections and recesses on a front face thereof and that the ultrafine grooves are provided on a face of the one resin layer provided with the ultrafine projections and recesses. In the case where the one resin layer has the ultrafine projections and recesses on the front face thereof and the ultrafine grooves are provided on the face of the one resin layer provided with the ultrafine projections and recesses, the ultrafine grooves enable transmission of the rays of light in the width direction of the ultrafine grooves, and the ultrafine projections and recesses enable diffusion of the rays of light. This enables improvement in the effects of, for example, preventing moire, preventing color separation, and expanding the viewing angle.

A backlight unit for a liquid crystal display device according to another aspect of the present invention made for solving the aforementioned problem includes: a light guide film or a light guide plate for guiding toward a front face side thereof rays of light having entered from an end face side thereof one or more LED light sources that are disposed on the end face side of the light guide film or the light guide plate and are for emitting rays of light to an end face of the light guide film or the light guide plate; and the optical sheet of the one aspect overlaid on the front face side of the light guide film or the light guide plate.

Due to the optical sheet included in the backlight unit of the liquid crystal display device of the another aspect, inhibition of the creation of hot spots is enabled as described above.

It is preferred that the optical sheet of the one aspect is overlaid directly on a front face of the light guide film or the light guide plate. In the case where the optical sheet is overlaid directly on the front face of the light guide film or the light guide plate, sufficient inhibition of the creation of hot spots is enabled.

It is preferred that in a planar view, an average orientation of the ultrafine grooves of the optical sheet with respect to an average direction of the rays of light emitted by the one or more LED light sources and incident on the light guide film or the light guide plate is directed at an angle within a range of −45° to 45°. In the case where the average orientation of the ultrafine grooves of the optical sheet is no greater than the upper limit, easy and reliable inhibition of the creation of hot spots is enabled.

It is to be noted that the term "front face side" as referred to herein means a viewer's side of a liquid crystal display device, and the term "back face side" as referred to herein means the opposite side thereof. The term "specific direction" as referred to herein means a specific one direction. The term "resin layer" as referred to herein means a layer containing a synthetic resin as a principal component. The term "principal component" as referred to herein means a component contained in the highest proportion, and refers to a component present in a proportion of, for example, no less than 50% by mass. The term "diffraction grating" as referred to herein means a structure that causes diffraction of incident light. The term "average orientation of the ultrafine grooves" as referred to herein means an average of orientations of straight lines passing through both longitudinal ends of randomly chosen 20 ultrafine grooves. In addition, the term "average number of ultrafine grooves" as referred to herein means the average number of ultrafine grooves at randomly chosen 10 positions. The term "arithmetic average roughness (Ra)" as referred to herein means a value determined in accordance with JIS-B0601: 1994, with a cut-off $\lambda c$ of 0.8 mm and an evaluation length of 4 mm. The term "average direction of the rays of light emitted by the one or more LED light sources and incident on the light guide film or the light guide plate" as referred to herein means the direction in which the intensity of the rays of light emitted by the one or more LED light sources and incident on the light guide film or the light guide plate is maximized when viewed from the front face side.

Effects of the Invention

As described in the foregoing, the optical sheet for a backlight unit and the backlight unit according to aspects of the present invention are capable of inhibiting the creation of hot spots.

DESCRIPTION OF EMBODIMENTS

Hereinafter, embodiments of the present invention will be described in detail with appropriate references to the drawings.

First Embodiment

Backlight Unit

Figure 1:
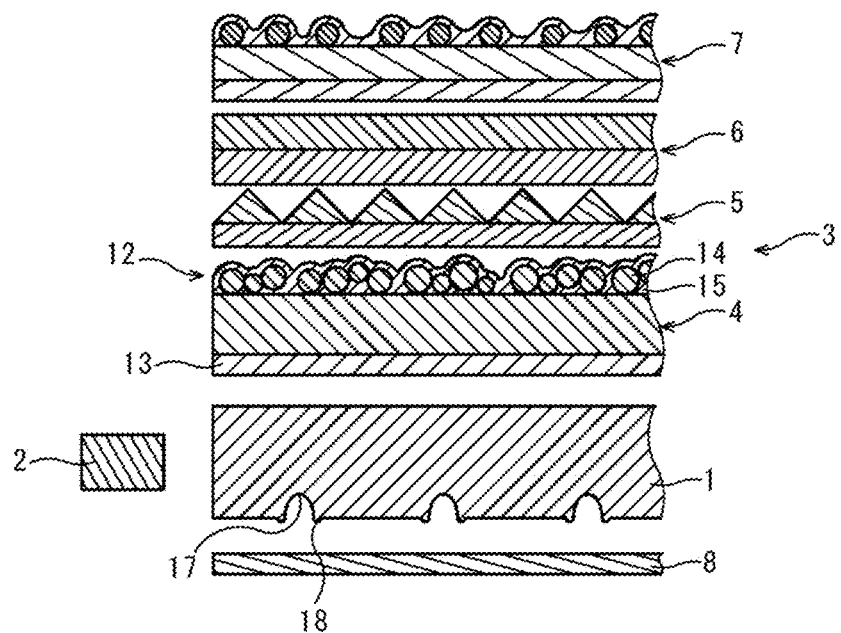
FIG. 1 is a schematic end view illustrating a backlight unit according to an embodiment of the present invention.

The backlight unit of the liquid crystal display device illustrated in FIG. 1 is an edge-lit backlight unit. The backlight unit is for a liquid crystal display device and is for guiding toward a front face side rays of light emitted by one or more LED light sources 2. The backlight unit of this embodiment includes: a light guide film 1 for guiding toward the front face side rays of light having entered from an end face thereof; the LED light sources 2 that are disposed on an end face side of the light guide film 1 and for emitting rays of light to an end face of the light guide film 1; and optical sheets 3 overlaid on a front face side of the light guide film 1. Sheets provided as the optical sheet 3 include: a light diffusion sheet (an underlayer light diffusion sheet 4) disposed on the front face side of the light guide film 1; a first prism sheet 5 disposed on a front face side of the underlayer light diffusion sheet 4; a second prism sheet 6 disposed on a front face side of the first prism sheet 5; and a light diffusion sheet (an upper-layer light diffusion sheet 7) disposed on a front face side of the second prism sheet 6. The backlight unit of this embodiment further includes a reflection sheet 8 disposed on the back face side of the light guide film 1. The underlayer light diffusion sheet 4 diffuses rays of light having entered from the back face side and condenses the rays of light toward the normal direction (condensing and diffusion of light). The first prism sheets 5 and the second prism sheet 6 refract rays of light having entered from the back face side toward the normal direction. Specifically, the ridge line direction of protruding-streak prism portions of the first prism sheet 5 is orthogonal to the ridge line direction of protruding-streak prism portions of the second prism sheet 6 are orthogonal to each other, so that the first prism sheet 5 refracts rays of light having entered from the underlayer light diffusion sheet 4 toward the normal direction side and in the direction perpendicular to the ridge line direction of the first prism sheet. The second prism sheet 6 refracts rays of light exiting from the first prism sheet 5 to allow the rays of light to travel in the direction substantially perpendicular to the back face of a liquid crystal display element. The upper-layer diffusion sheet 7 slightly diffuses rays of light having entered from its back face side to inhibit the lack in uniformity of luminance caused by, for example, the shapes of the protruding-streak prism portions of the first prism sheet 5 and the second prism sheet 6. The reflection sheet 8 reflects the rays of light exiting from the back face side of the light guide film 1 toward the front face side, and allows the rays of light to enter again the light guide film 1.

Underlayer Light Diffusion Sheet

Figure 2:
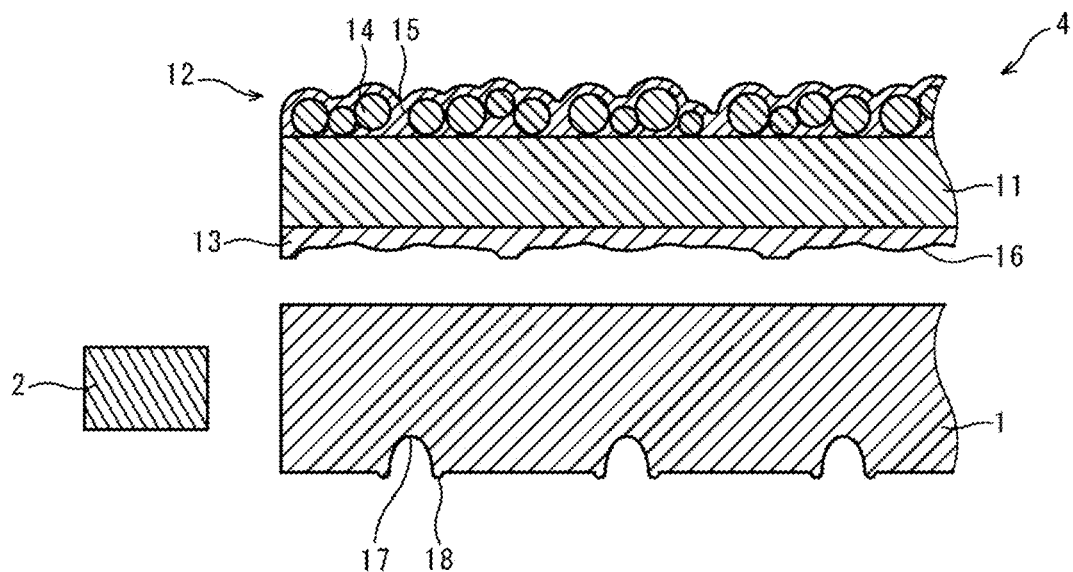
FIG. 2 is a schematic partial enlarged view illustrating an optical sheet, a light guide film and a light source of the backlight unit illustrated in FIG. 1.

As illustrated in FIG. 2, the underlayer light diffusion sheet 4 is overlaid directly on a front face of the light guide film 1 (without any other sheet, etc., being disposed therebetween). The underlayer light diffusion sheet 4 includes: a base film 11; a light diffusion layer 12 that is laminated on a front face side of the base film 11 and contains beads 14 and a binder 15 for the beads 14; and a protective layer 13 laminated on a back face side of the base film 11. The underlayer light diffusion sheet 4 has a three-layer structure including the base film 11, the light diffusion layer 12 laminated directly on the front face of the base film 11, and the protective layer 13 laminated directly on the back face of the base film 11. The underlayer light diffusion sheet 4 does not include layers other than the base film 11, the light diffusion layer 12 and the protective layer 13. The underlayer light diffusion sheet 4 is formed into a rectangular shape in a planar view. The underlayer light diffusion sheet 4 has ultrafine grooves 16 provided on a back face of the protective layer 13 as will be described below, and is configured as the optical sheet for a backlight unit according to the embodiment of the present invention.

Base Film

The base film 11 is a resin layer containing a synthetic resin as a principal component. Since the base film 11 needs to transmit rays of light, the base film 11 is formed from a transparent synthetic resin, particularly a colorless and transparent synthetic resin as a principal component. The principal component of the base film 11 is not particularly limited, and examples thereof include polyethylene terephthalate, polyethylene naphthalate, acrylic resins, polycarbonates, polystyrenes, polyolefins, cellulose acetate, weather resistant vinyl chlorides, and the like. Among these, polyethylene terephthalate having excellent transparency and high strength are preferred, and polyethylene terephthalate with improved deflection performance is particularly preferred.

The lower limit of an average thickness of the base film 11 is preferably 10 μm, more preferably 35 μm, and still more preferably 50 μm. The upper limit of the average thickness of the base film 11 is preferably 500 μm, more preferably 250 μm, and still more preferably 188 μm. In the case where the average thickness of the base film 11 is less than the lower limit, a curl may occur in the formation of the light diffusion layer 12 by coating. In the case where the average thickness of the base film 11 is less than the lower limit, deflections may be developed. Conversely, in the case where the average thickness of the base film 11 is greater than the upper limit, the luminance of the liquid crystal display device may be reduced, and a requirement for a reduction in the thickness of the liquid crystal display device may not be satisfied. It is to be noted that the term "average thickness" as referred to herein means a value obtained by averaging the thicknesses measured at randomly chosen 10 points.

Light Diffusion Layer

The light diffusion layer 12 is a resin layer containing a synthetic resin as a principal component. The light diffusion layer 12 constitutes the frontmost face of the underlayer light diffusion sheet 4. The light diffusion layer 12 contains the beads 14 in a dispersion state with a substantially uniform density. The beads 14 are surrounded by the binder 15. The light diffusion layer 12 in which the beads 14 are contained in a dispersion state is capable of diffusing, substantially uniformly, rays of light transmitted from the back face side to the front face side. In addition, due to the beads 14, ultrafine projections and recesses are provided substantially uniformly on the front face of the light diffusion layer 12, and the individual protruding portions and the individual recessed portions of the ultrafine projections and recesses are lens-shaped. The light diffusion layer 12 performs, owing to a lens-like effect of the ultrafine projections and recesses, a superior light diffusion function, and thus has, owing to its light diffusion function, both the function of refracting transmitted rays of light toward the normal direction and the function of condensing the transmitted rays of light macroscopically into the normal direction.

The beads 14 are resin particles having the property of diffusing rays of light. Examples of the principal component of the beads 14 include acrylic resins, acrylonitrile resins, polyurethane, polyvinyl chloride, polystyrene, polyamide, polyacrylonitrile, and the like. Of these, highly transparent acrylic resins are preferred, and polymethyl methacrylate (PMMA) is particularly preferred.

The shape of the beads 14 is not particularly limited, and may be for example, spherical, cubic, needle-like, rod-like, spindle-like, plate-like, scale-like, fiber-like, etc. In particular, spherical beads are preferred in light of superior light diffusibility.

The lower limit of the mean particle diameter of the beads 14 is preferably 1 μm, more preferably 2 μm, and still more preferably 5 μm. The upper limit of the mean particle diameter of the beads 14 is preferably 50 μm, more preferably 20 μm, and still more preferably 15 μm. In the case where the mean particle diameter of the beads 14 is less than the lower limit, the projections and recessions of the front surface of the light diffusion layer 12 are reduced, and the light diffusion sheet may not have the required light diffusibility. Conversely, in the case where the mean particle diameter of the beads 14 is greater than the upper limit, the thickness of the underlayer light diffusion sheet 4 may be increased, and it may be difficult to diffuse rays of light uniformly.

The lower limit of the content of the beads 14 (the content thereof on solid content basis with respect to 100 parts by mass of polymer components in a polymer composition which is a material for forming the binder 15) is preferably 10 parts by mass, more preferably 20 parts by mass, and still more preferably 50 parts by mass. The upper limit of the content of the beads 14 is preferably 500 parts by mass, more preferably 300 parts by mass, and still more preferably 200 parts by mass. In the case where the content of the light diffusing agent 14 is less than the lower limit, the light diffusibility may be insufficient. Conversely, in the case where the content of the beads 14 is greater than the upper limit, the beads 14 may not be fixed properly by the binder 15.

The binder 15 is prepared by hardening (through cross-linking, etc.) a polymer composition containing a base polymer. The binder 15 allows the beads 14 to be arranged and fixed with a substantially uniform density on the entire front face of the base film 11. It is to be noted that, for example, a fine inorganic filler, a curing agent, a plasticizer, a dispersant, various types of levelling agents, an antistatic agent, an ultraviolet ray-absorbing agent, an anti-oxidizing agent, a viscosity modifier, a lubricant, a light stabilizer, and the like may be further blended in the polymer composition for forming the binder 15, as needed.

Protective Layer

The protective layer 13 is a resin layer containing a synthetic resin as a principal component. The ultrafine grooves 16 are provided on the back face of the protective layer 13. The ultrafine grooves 16 preferably constitute the diffraction grating. The ultrafine grooves 16 are preferably formed as hairline stripes. For the backlight unit including the underlayer light diffusion sheet 4, in the case where the ultrafine grooves 16 are provided on the back face side of the protective layer 13 of the underlayer light diffusion sheet 4, the rays of light passing through the regions defined by the ultrafine grooves 16 are likely to be transmitted sufficiently in the width direction of the ultrafine grooves, owing to a difference in refractive index between the protective layer 13 and an air layer present on the back face side of the protective layer 13. Since the ultrafine grooves 16 are provided on the back face side of the protective layer 13 of the underlayer light diffusion sheet 4, the front face of the light guide film 1 partially abuts the back face of the protective layer 13. This enables prevention of the sticking of the underlayer light diffusion sheet 4 to the light guide film 1. In the case where the ultrafine grooves 16 constitute the diffraction grating, a diffraction phenomenon occurs, where the rays of light passing through the regions defined by the ultrafine grooves 16 have a certain optical path difference. Owing to the diffraction phenomenon, the underlayer light diffusion sheet 4 is likely to inhibit the creation of hot spots easily and reliably.

Figure 3:
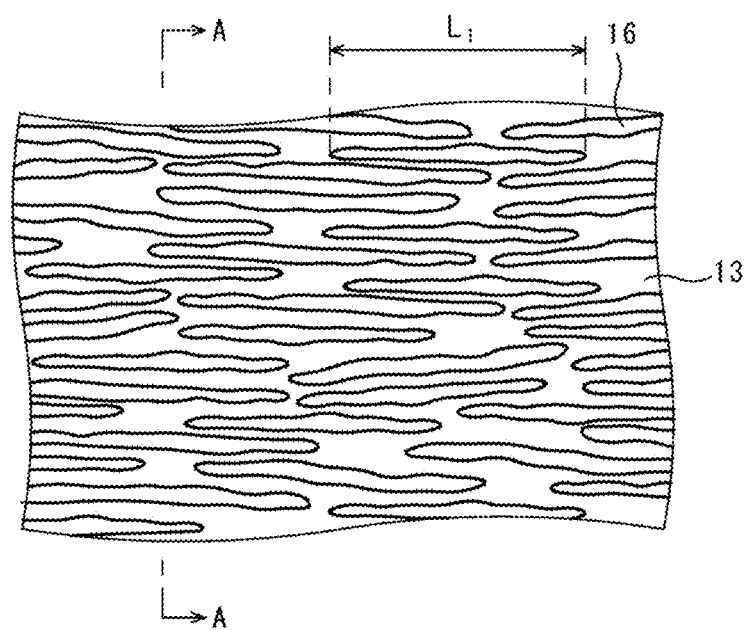
FIG. 3 is a schematic enlarged rear view of the optical sheet illustrated in FIG. 2.
Figure 4:
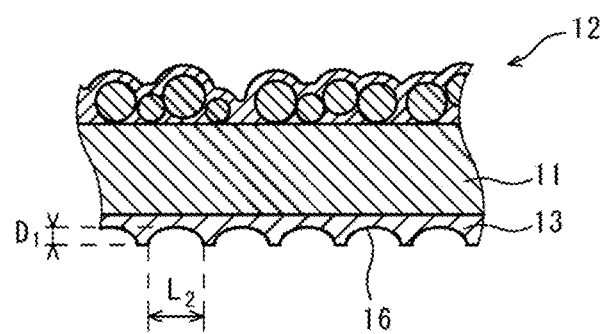
FIG. 4 is a partial enlarged end view taken along the line A-A of the optical sheet illustrated in FIG. 2.

As illustrated in FIG. 3, the ultrafine grooves 16 are provided substantially evenly (with a substantially uniform density) on the entire back face of the protective layer 13. The ultrafine grooves 16 each have a substantially U-shaped cross section, in other words, the ultrafine grooves 16 each do not have a triangular cross section. In the case where the ultrafine grooves 16 each have a substantially U-shaped cross section, the diffusion direction of the rays of light is adjusted appropriately, thereby enabling an improvement in the effect of reducing hot spots. The configuration in which the ultrafine grooves 16 each has a substantially U-shaped cross section enables an improvement in the mass productivity of the underlayer light diffusion sheet 4. As illustrated in FIGS. 2 to 4, the longitudinal direction of the ultrafine grooves 16 is parallel to one end of the back face of the protective layer 13. Specifically, the longitudinal direction of the ultrafine grooves 16 is aligned with the average direction of the rays of light emitted by the LED light sources 2. Furthermore, the ultrafine grooves 16 are irregular in orientation, in other words, the orientations of the ultrafine grooves 16 are not in perfect agreement with each other. Due to the ultrafine grooves 16 being irregular in orientation, inhibition of the iridescent unevenness in the liquid crystal display device which may be caused by the ultrafine grooves 16 is enabled. Although the ultrafine grooves 16 are preferably provided discretely for the purpose of regulating the diffusion direction of the rays of light, some of the ultrafine grooves 16 may intersect with each other.

In a planar view, the average orientation of the ultrafine grooves 16 with respect to the average direction of the rays of light emitted by the LED light sources 2 and incident on the light guide film 1 is preferably directed at an angle within a range of −45° to 45°, more preferably directed at an angle within a range of −15° to 15°, and still more preferably directed at an angle of ±0°. In the case where the average orientation falls outside the above range, it may be difficult to transmit the rays of light in the direction perpendicular to and the direction parallel to the direction of the rays of light emitted by the LED light sources 2 and in the horizontal direction. In the case where the average orientation falls within the range, the backlight unit is likely to inhibit the creation of hot spots easily and reliably.

As illustrated in FIG. 3, the ultrafine grooves 16 are elongated and substantially linear in a planar view. The width of each of the ultrafine grooves 16 varies randomly in the longitudinal direction of the ultrafine grooves 16. The lower limit of the ratio of an average length $L_1$ of the ultrafine grooves 16 in the longitudinal direction to an average width $L_2$ is preferably no less than 2, and more preferably no less than 3. The upper limit of the average length $L_1$ of the ultrafine grooves 16 in the longitudinal direction is not particularly limited, and the ultrafine grooves 16 may be continuous between both ends of the protective layer 13. The ratio of the average length $L_1$ to the average width $L_2$ is preferably 10,000, and more preferably no less than 5,000. In the case where the ratio of the average length $L_1$ of the ultrafine grooves 16 in the longitudinal direction is less than the lower limit, the amount of rays of light transmitted in the width direction of the ultrafine grooves 16 may not be increased sufficiently. Conversely, in the case where the ratio of the average length $L_1$ of the ultrafine grooves 16 in the longitudinal direction is greater than the upper limit, it may be difficult to provide, in order to inhibit generation of iridescent unevenness in the liquid crystal display device, the ultrafine grooves 16 that are irregular in orientation and densely formed. It is to be noted that the term "average length of the ultrafine grooves in the longitudinal direction" as referred to herein means a value obtained by averaging the longitudinal lengths of randomly chosen 20 ultrafine grooves on the average interface of the resin layer.

The lower limit of an average width $L_2$ of the ultrafine grooves 16 is preferably 10 nm, more preferably 50 nm, and still more preferably 100 nm. The upper limit of the average width $L_2$ of the ultrafine grooves 16 is preferably 40 μm, more preferably 30 μm, still more preferably 20 μm, and particularly preferably 10 μm. In the case where the average width $L_2$ of the large ultrafine grooves 16 is less than the lower limit, formability of the ultrafine grooves 16 may deteriorate. Conversely, in the case where the average width $L_2$ of the ultrafine grooves 16 is greater than the upper limit, the amount of rays of light transmitted in the width direction of the ultrafine grooves 16 may not be increased sufficiently. It is preferred that the width $L_2$ of each of the ultrafine grooves 16 varies randomly within the above range, along the longitudinal direction. In the case where each of the ultrafine grooves 16 is formed such that the width $L_2$ thereof varies randomly within the above range, prevention of moire caused by interference with other members (e.g., prism sheets, liquid crystal cells, etc.) having a cyclic pitch is enabled. Also, prevention of regularly occurring color separation is enabled, and in turn, prevention of iridescent unevenness is enabled. It is to be noted that the term "average width of the ultrafine grooves" as referred to herein means a value obtained by averaging widths measured at randomly chosen points except for the longitudinal ends, of randomly chosen 20 ultrafine grooves on the average interface of the resin layer.

The upper limit of the average pitch of the ultrafine grooves 16 is preferably 10 nm, more preferably 50 nm, and still more preferably 100 nm. The upper limit of the average pitch of the ultrafine grooves 16 is preferably 40 μm, more preferably 30 μm, still more preferably 20 μm, and particularly preferably 10 μm. In the case where the average pitch of the ultrafine grooves 16 is less than the lower limit, formability of the ultrafine grooves 16 may deteriorate. Conversely, in the case where the average pitch of the ultrafine grooves 16 is greater than the upper limit, the amount of rays of light transmitted in the width direction of the ultrafine grooves 16 may not be increased sufficiently. It is to be noted that the term "average pitch of the ultrafine grooves" as referred to herein means a value obtained by averaging the pitches of randomly chosen 10 ultrafine grooves that are adjacent to each other in the direction perpendicular to the average orientation of the ultrafine grooves.

The upper limit of the standard deviation of the pitches of the ultrafine grooves 16 is preferably 10 μm, more preferably 9 μm, and still more preferably 7 μm. In the case where the standard deviation of the pitches of the ultrafine grooves 16 is greater than the upper limit, the ultrafine grooves 16 may be irregular in pitch, and thus, the amount of rays of light transmitted in the width direction of the ultrafine grooves 16 may not be increased evenly. The lower limit of the standard deviation of the pitches of the ultrafine grooves 16 may be, for example, 4 μm, in light of ease in arranging the ultrafine grooves 16 in comparatively random directions. It is to be noted that the term "standard deviation of the pitches of the ultrafine grooves" as referred to herein means a standard deviation of the pitches of randomly chosen 20 ultrafine grooves.

It is preferred that the average width $L_2$ and the average pitch of the ultrafine grooves 16 respectively fall within the above ranges. Due to the average width $L_2$ and the average pitch of the ultrafine grooves 16 respectively falling within the above ranges, the underlayer light diffusion sheet 4 is capable of sufficiently increasing the amount of rays of light transmitted in the width direction of the ultrafine grooves 16 easily and reliably.

The lower limit of the average number of the ultrafine grooves 16 per unit length in the direction perpendicular to the average orientation of the ultrafine grooves 16 is preferably 10/mm, more preferably 50/mm, and still more preferably 100/mm. The upper limit of the average number is preferably 10,000/mm, more preferably 5,000/mm, and still more preferably 1,000/mm. In the case where the average number is less than the lower limit, the amount of rays of light transmitted in the width direction of the ultrafine grooves 16 may not be increased sufficiently. Conversely, in the case where the average number is greater than the upper limit, formability of the ultrafine grooves 16 may deteriorate.

The lower limit of an average depth $D_1$ of the ultrafine grooves 16 is preferably 10 nm, more preferably 500 nm, still more preferably 1 μm, and particularly preferably 2 μm. The upper limit of the average depth $D_1$ of the ultrafine grooves 16 is preferably 30 μm, more preferably 10 μm, still more preferably 5 μm, and particularly preferably 3 μm. In the case where the average depth $D_1$ of the ultrafine grooves 16 is less than the lower limit, the amount of rays of light transmitted in the width direction of the ultrafine grooves 16 may not be increased sufficiently. Conversely, in the case where the average depth $D_1$ of the ultrafine grooves 16 is greater than the upper limit, the strength of the protective layer 13 may be decreased. It is to be noted that the term "average depth of the ultrafine grooves" as referred to herein means a value obtained by averaging the depths of randomly chosen 20 ultrafine grooves, each depth being the distance between the average interface of the resin layer and the bottom of the ultrafine groove concerned.

The upper limit of the standard deviation of the depths of the ultrafine grooves 16 is preferably 4 µm, more preferably 3 µm, and still more preferably 2.5 µm. In the case where the standard deviation of the depths of the ultrafine grooves 16 is greater than the upper limit, the ultrafine grooves 16 may be irregular in depth, and thus, the amount of rays of light transmitted in the width direction of the ultrafine grooves 16 may not be increased evenly. The lower limit of the standard deviation of the depths of the ultrafine grooves 16 is not particularly limited, and may be, for example, 0.3 µm. It is to be noted that the term "standard deviation of the depths of the ultrafine grooves" as referred to herein means a standard deviation of the depths of randomly chosen 20 ultrafine grooves.

The lower limit of the arithmetic average roughness (Ra), in the direction parallel to the orientation of the ultrafine grooves 16, of the face (back face) of the protective layer 13 provided with the ultrafine grooves 16 is preferably 0.005 µm, more preferably 0.05 µm, and still more preferably 0.1 µm. The upper limit of the arithmetic average roughness (Ra), in the direction parallel to the orientation of the ultrafine grooves 16, of the face (back face) of the protective layer 13 provided with the ultrafine grooves 16 is preferably 1.5 µm, more preferably 1.2 µm, and still more preferably 1 µm. In the case where the arithmetic average roughness (Ra) is less than the lower limit, the effect of inhibiting the creation of hot spots may be insufficient. Conversely, in the case where the arithmetic average roughness (Ra) is greater than the upper limit, the amount of rays of light transmitted in the direction parallel to the orientation of the ultrafine grooves 16 may be great with respect to the amount of rays of light transmitted in the width direction of the ultrafine grooves 16.

The lower limit of the arithmetic average roughness (Ra), in the direction perpendicular to the orientation of the ultrafine grooves 16, of the face (back face) of the protective layer 13 provided with the ultrafine grooves 16 is preferably 0.01 µm, more preferably 0.1 µm, and still more preferably 0.5 µm. The upper limit of the arithmetic average roughness (Ra), in the direction perpendicular to the orientation of the ultrafine grooves 16, of the face (back face) of the protective layer 13 provided with the ultrafine grooves 16 is preferably 5 µm, more preferably 2 µm, still more preferably 1.7 µm, and particularly preferably 1.5 µm. In the case where the arithmetic average roughness (Ra) is less than the lower limit, the amount of rays of light transmitted in the width direction of the ultrafine grooves 16 may not be increased sufficiently. Conversely, in the case where the arithmetic average roughness (Ra) is greater than the upper limit, it may be difficult to regulate the angles at which the rays of light are emitted.

For the arithmetic average roughness (Ra) of the face (back face) of the protective layer 13 provided with the ultrafine grooves 16, it is preferred that the average roughness (Ra) in the direction parallel to the orientation of the ultrafine grooves 16 and the arithmetic average roughness (Ra) in the direction perpendicular to the orientation of the ultrafine grooves 16 respectively fall within the above ranges. In the case where the arithmetic average roughness (Ra) in the direction parallel to the orientation of the ultrafine grooves 16 and the arithmetic average roughness (Ra) in the direction perpendicular to the ultrafine grooves 16 respectively fall within the above ranges, the underlayer light diffusion sheet 4 is likely to sufficiently increase the amount of rays of light transmitted in the width direction of the ultrafine grooves 16, thus inhibiting the creation of hot spots easily and reliably.

For the face (back face) of the protective layer 13 provided with the ultrafine grooves 16, the lower limit of the difference between the arithmetic average roughness (Ra) in the direction perpendicular to the orientation of the ultrafine grooves 16 and the arithmetic average roughness (Ra) in the direction parallel to the orientation of the ultrafine grooves 16 is preferably 0.5 µm, more preferably 0.7 µm, and still more preferably 1 µm. In the case where the difference in the arithmetic average roughness (Ra) is greater than the lower limit, the amount of rays of light transmitted in the width direction of the ultrafine grooves 16 is increased, and thus, the lack in uniformity of luminance of the liquid crystal display device is likely to be reduced easily and reliably. The upper limit of the difference in arithmetic average roughness (Ra) may be, for example, 1.9 µm.

The lower limit of the maximum height (Ry) of the face (back face), in the direction parallel to the orientation of the ultrafine grooves 16, of the protective layer 13 provided with the ultrafine grooves 16 is preferably 0.1 µm, more preferably 1 µm, and still more preferably 1.5 µm. The upper limit of the maximum height (Ry), in the direction parallel to the orientation of the ultrafine grooves 16, of the face (back face) of the protective layer 13 provided with the ultrafine grooves 16 is preferably 3 µm, more preferably 2.5 µm, and still more preferably 2 µm. In the case where the maximum height (Ry) is less than the lower limit, the effect of inhibiting the creation of hot spots may be insufficient. Conversely, in the case where the maximum height (Ry) is greater than the upper limit, the amount of rays of light transmitted in the direction parallel to the orientation of the ultrafine grooves 16 may be great with respect to the amount of rays of light transmitted in the width direction of the ultrafine grooves 16. The term "maximum height (Ry)" as referred to herein means a value determined in accordance with JIS-B0601: 1994, with a cut-off λc of 0.8 mm and an evaluation length of 4 mm.

The lower limit of the maximum height (Ry) of the face (back face) of the protective layer 13 provided with the ultrafine grooves 16 in the direction perpendicular to the orientation of the ultrafine grooves 16 is preferably 4 µm, more preferably 5 µm, and still more preferably 6 µm. The upper limit of the maximum height (Ry) of the face (back face) of the protective layer 13 provided with the ultrafine grooves 16 in the direction perpendicular to the orientation of the ultrafine grooves 16 is preferably 12 µm, more preferably 10 µm, and still more preferably 9 µm. In the case where the maximum height (Ry) is less than the lower limit, the amount of rays of light transmitted in the width direction of the ultrafine grooves 16 may not be increased sufficiently. Conversely, in the case where the maximum height (Ry) is greater than the upper limit, it may be difficult to regulate the angles at which the rays of light are emitted.

For the face (back face) of the protective layer 13 provided with the ultrafine grooves 16, the lower limit of the difference between the maximum height (Ry) in the direction perpendicular to the orientation of the ultrafine grooves 16 and the maximum height (Ry) in the direction parallel to the orientation of the ultrafine grooves 16 is preferably 4 μm, more preferably 5 μm, and still more preferably 6 μm. In the case where the difference in the maximum height (Ry) is greater than the lower limit, the amount of rays of light transmitted in the width direction of the ultrafine grooves 16 is increased, and thus, the lack in uniformity of luminance of the liquid crystal display device is likely to be reduced easily and reliably. The upper limit of the difference in maximum height (Ry) may be, for example, 11 μm.

The lower limit of the ten-point mean roughness (Rz), in the direction parallel to the orientation of the ultrafine grooves 16, of the face (back face) of the protective layer 13 provided with the ultrafine grooves 16 is preferably 0.1 μm, more preferably 0.5 μm, and still more preferably 1 μm. The upper limit of the ten-point mean roughness (Rz), in the direction parallel to the orientation of the ultrafine grooves 16, of the face (back face) of the protective layer 13 provided with the ultrafine grooves 16 is preferably 2.5 μm, more preferably 2 μm, and still more preferably 1.5 μm. In the case where the ten-point mean roughness (Rz) is less than the lower limit, the effect of inhibiting the creation of hot spots may be insufficient. Conversely, in the case where the ten-point mean roughness (Rz) is greater than the upper limit, the amount of rays of light transmitted in the direction parallel to the orientation of the ultrafine grooves 16 may be great with respect to the amount of rays of light transmitted in the width direction of the ultrafine grooves 16. The term "ten-point mean roughness (Rz)" as referred to herein means a value determined in accordance with JIS-B0601: 1994, with a cut-off λc of 0.8 mm and an evaluation length of 4 mm.

The lower limit of the ten-point mean roughness (Rz), in the direction perpendicular to the orientation of the ultrafine grooves 16, of the face (back face) of the protective layer 13 provided with the ultrafine grooves 16 is preferably 4 μm, more preferably 5 μm, and still more preferably 6 μm. The upper limit of the ten-point mean roughness (Rz), in the direction perpendicular to the orientation of the ultrafine grooves 16, of the face of the protective layer 13 provided with the ultrafine grooves 16 is preferably 10 μm, more preferably 8 μm, and still more preferably 7 μm. In the case where the ten-point mean roughness (Rz) is less than the lower limit, the amount of rays of light transmitted in the width direction of the ultrafine grooves 16 may not be increased sufficiently. Conversely, in the case where the ten-point mean roughness (Rz) is greater than the upper limit, it may be difficult to regulate the angles at which the rays of light are emitted.

For the face (back face) of the protective layer 13 provided with the ultrafine grooves 16, the lower limit of the difference between the ten-point mean roughness (Rz) in the direction perpendicular to the orientation of the ultrafine grooves 16 and the ten-point mean roughness (Rz) in the direction parallel to the orientation of the ultrafine grooves 16 is preferably 3 μm, more preferably 4 μm, and still more preferably 4.5 μm. In the case where the difference in the ten-point mean roughness (Rz) is greater than the lower limit, the amount of rays of light transmitted in the width direction of the ultrafine grooves 16 is increased, and thus, the lack in uniformity of luminance of the liquid crystal display device is likely to be reduced easily and reliably. The upper limit of the difference in ten-point mean roughness (Rz) may be, for example, 9 μm.

The lower limit of the root mean square slope (RΔq), in the direction parallel to the orientation of the ultrafine grooves 16, of the face (back face) of the protective layer 13 provided with the ultrafine grooves 16 is preferably 0.05, more preferably 0.2, still more preferably 0.25, and particularly preferably 0.3. The upper limit of the root mean square slope (RΔq), in the direction parallel to the orientation of the ultrafine grooves 16, of the face (back face) of the protective layer 13 provided with the ultrafine grooves 16 is preferably 0.5, more preferably 0.45, and still more preferably 0.4. In the case where the root mean square slope (RΔq) is less than the lower limit, the effect of inhibiting the creation of hot spots may be insufficient. Conversely, in the case where the root mean square slope (RΔq) is greater than the upper limit, the amount of rays of light transmitted in the direction parallel to the orientation of the ultrafine grooves 16 may be great with respect to the amount of rays of light transmitted in the width direction of the ultrafine grooves 16. The term "root mean square slope (RΔq)" as referred to herein means a value determined in accordance with JIS-B0601: 2001.

The lower limit of the root mean square slope (RΔq), in the direction perpendicular to the orientation of the ultrafine grooves 16, of the face (back face) of the protective layer 13 provided with the ultrafine grooves 16 is preferably 0.5, more preferably 0.7, and still more preferably 1. The upper limit of the root mean square slope (RΔq), in the direction perpendicular to the orientation of the ultrafine grooves 16, of the face (back face) of the protective layer 13 provided with the ultrafine grooves 16 is preferably 2.5, more preferably 2, and still more preferably 1.8. In the case where the root mean square slope (RΔq) is less than the lower limit, the amount of rays of light transmitted in the width direction of the ultrafine grooves 16 may not be increased sufficiently. Conversely, in the case where the root mean square slope (RΔq) is greater than the upper limit, it may be difficult to regulate the angles at which the rays of light are emitted.

For the face (back face) of the protective layer 13 provided with the ultrafine grooves 16, the lower limit of the difference between the root mean square slope (RΔq) in the direction perpendicular to the orientation of the ultrafine grooves 16 and the root mean square slope (RΔq) in the direction parallel to the orientation of the ultrafine grooves 16 is preferably 0.5, more preferably 0.7, and still more preferably 1. In the case where the difference in the root mean square slope (RΔq) is greater than the lower limit, the amount of rays of light transmitted in the width direction of the ultrafine grooves 16 is increased, and thus, the lack in uniformity of luminance of the liquid crystal display device is likely to be reduced easily and reliably. The upper limit of the difference in root mean square slope (RΔq) may be, for example, 2.2.

The principal component of the protective layer 13 is exemplified by a polycarbonate, an acrylic resin, a urethane resin, an acrylic-urethane copolymer, polyethylene terephthalate, polyethylene naphthalate, a polystyrene, a methyl (meth)acrylate-styrene copolymer, a polyolefin, a cycloolefin polymer, a cycloolefin copolymer, cellulose acetate, a weather resistant vinyl chloride, an active energy ray-curable resin, and the like. Of these, an acrylic resin is preferred, which increases the strength of the back face of the underlayer light diffusion sheet 4 and is likely to prevent generation of scratches on the back face.

The lower limit of the average thickness of the protective layer 13 is preferably 1 μm, and more preferably 5 μm. The upper limit of the average thickness of the protective layer 13 is preferably 50 μm, and more preferably 10 μm. In the case where the average thickness of the protective layer 13 is less than the lower limit, generation of scratches on the back face of the underlayer light diffusion sheet 4 may not be prevented properly. Conversely, in the case where the average thickness of the protective layer 13 is greater than the upper limit, the luminance of the liquid crystal display device may be reduced.

The lower limit of the refractive index of the protective layer 13 is preferably 1.36, more preferably 1.4, and still more preferably 1.43. The upper limit of the refractive index of the protective layer 23 is preferably 1.7, more preferably 1.5, and still more preferably 1.49. In the case where the refractive index of the protective layer 13 falls within the above range, the amount of the rays of light transmitted in the width direction of the ultrafine grooves 16 is increased, owing to the difference in refractive index between the protective layer 13 and the air layer present on the back face side of the protective layer 13, and thus, the lack in uniformity of luminance of the liquid crystal display device is likely to be reduced easily and reliably.

Prism Sheet

Each of the first prism sheet 5 and the second prism sheet 6 includes a substrate layer and a row of projections including protruding-streak prism portions laminated on the front face of the substrate layer. Since the substrate layer and the protruding-streak prism portions need to transmit rays of light, each of the substrate layer and the protruding-streak prism portions is a resin layer containing a transparent synthetic resin, particularly a colorless and transparent synthetic resin as a principal component. The ridge line direction of the protruding-streak prism portions of the first prism sheet 5 is substantially orthogonal to the ridge line direction of the protruding-streak prism portions of the second prism sheet 6.

The lower limit of the thickness of each of the first prism sheet 5 and the second prism sheet 6 (the height from the back face of the substrate layer to the vertex of each protruding-streak prism portion) is preferably 50 µm, and more preferably 100 µm. The upper limit of the thickness of each of the first prism sheet 5 and the second prism sheet 6 is preferably 200 µm, and more preferably 180 µm. The lower limit of the pitch of the protruding-streak prism portions of each of the first prism sheet 5 and the second prism sheet 6 is preferably 30 µm, and more preferably 40 µm. The upper limit of the pitch of the protruding-streak prism portions of each of the first prism sheet 5 and the second prism sheet 6 is preferably 100 µm, and more preferably 60 µm. The vertex angle of each protruding-streak prism portion is preferably no less than 85° and no greater than 95°. The lower limit of the refractive index of each of the first prism sheet 5 and the second prism sheet 6 is preferably 1.5, and more preferably 1.55. The upper limit of the refractive index of each of the first prism sheet 5 and the second prism sheet 6 is preferably 1.7. It is to be noted that the term "refractive index of the prism sheet" as referred to herein means the refractive index of the protruding-streak prism portions.

Upper-Layer Light Diffusion Sheet

The upper-layer light diffusion sheet 7 includes: a base film; a light diffusion layer that is laminated on a front face side of the base film and contains beads and a binder for the beads; and a protective layer laminated on a back face side of the base film. The upper-layer light diffusion sheet 7 has a three-layer structure including the base film, the light diffusion layer laminated directly on the front face of the base film, and the protective layer laminated directly on the back face of the base film. The upper-layer light diffusion sheet 7 does not include layers other than the base film, the light diffusion layer and the protective layer. The upper-layer light diffusion sheet 7 is formed into a rectangular shape in a planar view.

Each of the base film, the light diffusion layer and the protective layer of the upper-layer light diffusion sheet 7 is a resin layer containing a synthetic resin as a principal component. The base film of the upper-layer light diffusion sheet 7 may have a configuration similar to that of the base film 11 of the underlayer light diffusion sheet 4. The protective layer of the upper-layer light diffusion sheet 7 may have a configuration similar to that of the protective layer 13 of the underlayer light diffusion sheet 4, except that the protective layer is not provided with ultrafine grooves. Meanwhile, the light diffusibility of the light diffusion layer of the upper-layer light diffusion sheet 7 does not need to be as high as that of the light diffusion layer 12 of the underlayer light diffusion sheet 4. Thus, the lower limit of the content of a light diffusing agent is preferably 5 parts by mass and more preferably 10 parts by mass, whereas the upper limit thereof is preferably 40 parts by mass and more preferably 30 parts by mass.

Light Guide Film

The light guide film 1 allows the rays of light incident on its end face to exit from its front face substantially uniformly. The light guide film 1 is formed into a plate-like shape (non-wedge shape) that is substantially rectangular in a planar view and has a substantially uniform thickness. The light guide film 1 includes, on the back face thereof, recessed portions 17 falling toward the front face side. In addition, the light guide film 1 includes, on the back face thereof, sticking preventive portions. Specifically, the light guide film 1 includes, as the sticking preventive portions, raised portions 18 provided to surround the recessed portions 17, and protruding toward the back face side. The raised portions 18 adjoin the recessed portions 17, with the forming face of each recessed portion 17 being continuous with the inner lateral face of each surrounding raised portion 18. The light guide film 1 is a resin layer containing a synthetic resin as a principal component.

The lower limit of the average thickness of the light guide film 1 is preferably 100 µm, more preferably 150 µm, and still more preferably 200 µm. The upper limit of the average thickness of the light guide film 1 is preferably 600 µm, more preferably 580 µm, and still more preferably 550 µm. In the case where the average thickness of the light guide film 1 is less than the lower limit, the strength of the light guide film 1 may be insufficient, and the rays of light from the LED light sources 2 may not be allowed to enter the light guide film 1 sufficiently. Conversely, in the case where the average thickness of the light guide film 1 is greater than the upper limit, the requirement for a reduction in the thickness of the backlight unit of this embodiment may not be satisfied.

The recessed portions 17 function as a light scattering portion for scattering incident light toward the front face side. Each recessed portion 17 is formed into a substantially circular shape in a planar view. Furthermore, each recessed portions 17 is formed such that the diameter thereof gradually decreases toward the front face side. The shape of each recessed portion 17 is not particularly limited, and may be hemispherical, semielliptical, conical, frustoconical, or the like. Of these, the shape of each recessed portion 17 is preferably hemispherical or semielliptical. In the case where the recessed portions 17 each have a hemispherical or semielliptical shape, the formability of the recessed portions 17 may be improved, and additionally, rays of light incident on the recessed portions 17 can be favorably scattered.

The raised portions 18 are formed on the back face of the light guide film 1, so as to be continuous with the surface perpendicular to the thickness direction of the light guide film 1. Specifically, the raised portions 18 are formed so as to be continuous with the flat surface of the back face of the light guide film 1. The raised portions 18 are formed to be substantially annular in a planar view so as to surround the recessed portions 17. In the case where the raised portions 18 are formed to be substantially annular in a planar view so as to surround the recessed portions 17, the light guide film 1 is capable of easily and reliably preventing the recessed portions 17 and the vicinity of the recessed portions 17 from sticking to the reflection sheet 8 disposed on the back face side of the light guide film 1.

The light guide film 1 has flexibility. Owing to the flexibility, the light guide film 1 is capable of inhibiting generation of scratches on the reflection sheet 8 disposed on the back face side of the light guide film 1. Since the light guide film 1 needs to transmit rays of light, the light guide film 1 is formed to be transparent, in particular, colorless and transparent.

The principal component of the light guide film 1 is exemplified by a polycarbonate, an acrylic resin, polyethylene terephthalate, polyethylene naphthalate, a polystyrene, a methyl (meth)acrylate-styrene copolymer, a polyolefin, a cycloolefin polymer, a cycloolefin copolymer, cellulose acetate, a weather resistant vinyl chloride, an active energy ray-curable resin, and the like. Of these, polycarbonate or an acrylic resin is preferred as the principal component of the light guide film 1. In the case where the light guide sheet 1 contains a polycarbonate, which has superior transparency and a high refractive index, as a principal component, the total reflection is likely to occur on the front and back faces of the light guide film 1, whereby rays of light can be efficiently transmitted. In addition, owing to the heat resistance of the polycarbonate, the light guide film 1 is less prone to, for example, degradation caused by heat of the LED light sources 2. Furthermore, a polycarbonate is less water-absorbent than acrylic resins and the like, and is thus superior in dimension accuracy to the acrylic resins and the like. Therefore, due to containing a polycarbonate as the principal component, the light guide film 1 is capable of inhibiting degradation over time. On the other hand, since the acrylic resins have a higher degree of transparency, a loss of rays of light in the light guide film 1 can be reduced.

LED Light Sources

The LED light sources 2 are disposed along the end face of the light guide film 1. Each of the LED light sources 2 is disposed in such a manner that a light emission surface thereof faces (or abuts) the end face of the light guide film 1.

Reflection Sheet

The reflection sheet 8 includes a resin layer containing a synthetic resin as a principal component. The reflection sheet 8 may be configured either as a white resin layer in which a filler is dispersed in a base resin such as a polyester, or as a mirror sheet obtained by vapor deposition of a metal such as aluminum and silver on the front face of a resin layer formed from a polyester or the like to enhance regular reflection properties.

Function of Reducing Lack in Uniformity of Luminance

Figure 5:
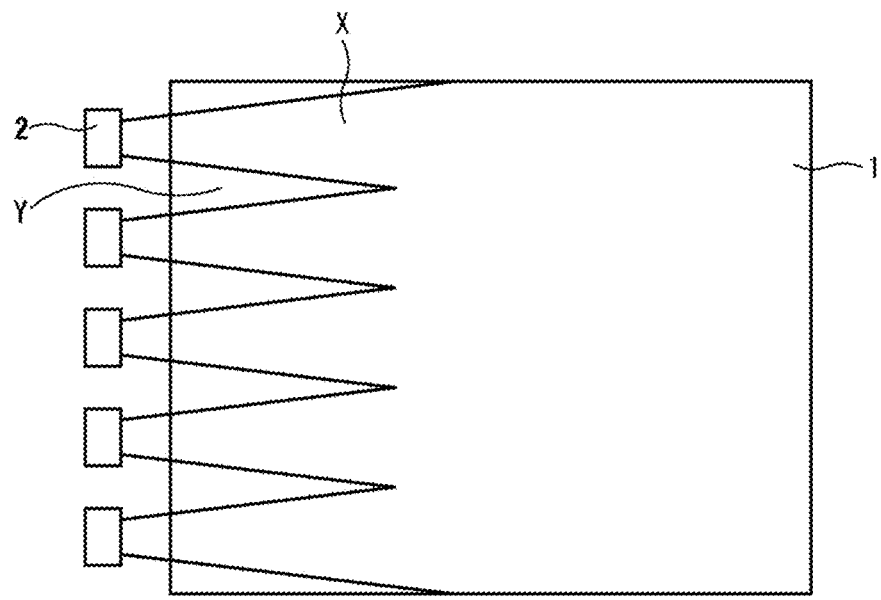
FIG. 5 is a schematic plan view illustrating hot spots on the backlight unit illustrated in FIG. 1.
Figure 6:
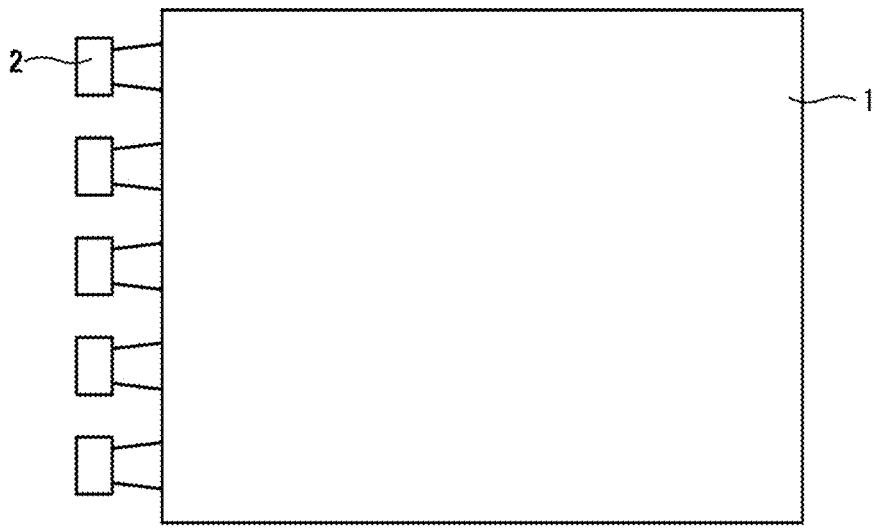
FIG. 6 is a schematic plan view for describing the function of reducing the lack in uniformity of luminance of the backlight unit illustrated in FIG. 1.

With reference to FIGS. 5 and 6, the underlayer light diffusion sheet 4 and the backlight unit of this embodiment will be described in relation to the function of reducing the lack in uniformity of luminance. With reference to FIG. 5, the amount of rays of light emitted by the LED light sources 2 and incident on the light guide film 1 is now described. The rays of light emitted by the LED light sources 2 enter the light guide film 1 substantially perpendicularly from an end face (incidence end face) of the light guide film 1 opposed to the LED light sources 2, are then transmitted toward an end face opposite to the incident end face. The rays of light emitted by the LED light sources 2 are highly directive, and thus, the amount of rays of light is extremely great particularly in regions X, each of which is located at and around an incident part of the light guide film 1. The LED light sources 2 are disposed with a predetermined gap therebetween, and thus, the amount of rays of light is extremely small in regions Y, each of which is positioned between two incident parts (two adjacent regions X) of the light guide film 1.

With reference to FIG. 6, the underlayer light diffusion sheet 4 and the backlight unit of this embodiment will be described in relation to the function of reducing the lack in uniformity of luminance. Many of the rays of light having exited from the regions X and having been emitted toward the front face side of the light guide film 1 are incident on the back face of the protective layer 13 of the underlayer light diffusion sheet 4 in such a manner that these rays of light are aligned with the direction of the rays of light emitted by the LED light sources 2. It is presumed that due to the ultrafine grooves 16 aligned with the direction of the rays of light emitted by the LED light sources 2, the rays of light incident on the back face of the protective layer 13 of the underlayer light diffusion sheet 4 are transmitted in the width direction of the ultrafine grooves 16. In other words, it is presumed that as illustrated in FIG. 6, the rays of light incident on the ultrafine grooves 16 are transmitted toward the regions Y in a planar view. It is presumed that the amount of rays of light thus becomes consistent across the regions X and the regions Y, and that the lack in uniformity of luminance is reduced accordingly.

Advantages

In the case where the optical sheet for a backlight unit of this embodiment (the underlayer light diffusion sheet 4) is included in a backlight unit equipped with LEDs serving as the light sources, the optical sheet is capable of inhibiting the creation of hot spots. Although the reason for this effect is not necessarily clarified, it is presumed that the rays of light passing through regions defined by the ultrafine grooves 16, which are provided on the resin layer of the optical sheet for a backlight unit and are oriented in the specific directions, are transmitted in the width direction of the ultrafine grooves 16, and that the inhibition of the creation of hot spots is enabled even when highly directive rays of light are emitted by the LEDs.

The optical sheet for a backlight unit of this embodiment (the underlayer light diffusion sheet 4) includes the base film 11, the light diffusion layer 12 that is laminated on the front face side of the base film 11 and contains the beads 14 and the binder 15 for the beads 14, and the protective layer 13 laminated on the back face side of the base film 11, and thus, rays of light diffused substantially uniformly over the entire face are likely to be emitted.

The backlight unit, which includes the optical sheet for a backlight unit (the underlayer light diffusion sheet 4), is capable of inhibiting the creation of hot spots as described above.

The backlight unit of this embodiment, in which the optical sheet of this embodiment (the underlayer light diffusion sheet 4) is overlaid directly on the front face of the light guide film 1, is capable of sufficiently inhibiting the creation of hot spots.

Method for Producing Underlayer Light Diffusion Sheet

A method for producing the underlayer light diffusion sheet 4 of this embodiment includes: forming a sheet body which is to serve as the base film 11 (base film-forming step); laminating the protective layer 13 on one face side of the sheet body (protective layer-laminating step); and laminating the light diffusion layer 12 on the other face side of the sheet body (light diffusion layer-laminating step).

Base Film-Forming Step

Although the base film-forming step is not particularly limited, the step may be exemplified by a process of forming the sheet body by subjecting a molten thermoplastic resin to extrusion molding using a T die, and subsequently drawing the extrusion-molded article in both a layer longitudinal direction and a layer width direction. Well-known extrusion molding processes employing the T die may include, for example, a polishing roll process and a chill roll process. In addition, drawing processing of the extrusion-molded article may be exemplified by a biaxial drawing process for tubular films, a biaxial drawing process for flat films, and the like.

Protective Layer-Laminating Step

The protective layer-laminating step is exemplified by a process in which a coating liquid containing materials for forming the protective layer is applied to one face side of the sheet body formed in the base film-forming step, and then the shape of the ultrafine grooves 16 is transferred to one face side of a coating film obtained by the application of the coating liquid, by using a mold having on the surface thereof a reversal shape of the ultrafine grooves 16. The process for applying the coating liquid is not particularly limited, and may be exemplified by spin coating, spray coating, slide coating, dip coating, bar coating, roll coating, screen printing, or the like. As the mold, a metal roller or a metal plate having on the surface thereof a reversal shape of the ultrafine grooves 16 may be used. In the protective layer-laminating step, the coating film may be dried as needed. In the protective layer-laminating step, the coating film having the shape of ultrafine grooves 16 transferred to the one face side thereof may be hardened by heating, ultraviolet irradiation, or the like. The base film-forming step and the protective layer-laminating step may be simultaneously performed by using a coextrusion molding process. In the protective layer-laminating step, a sheet body obtained by hardening the material for forming the protective layer is laminated on one face side of the base film, and then, the ultrafine grooves 16 may be formed on one face of the sheet body by laser processing, filing, or the like, or the ultrafine grooves 16 may be formed on the sheet body by a photolithography process and an etching process.

Light Diffusion Layer-Laminating Step

The light diffusion layer-laminating step is exemplified by a process in which a coating liquid containing the beads 14 and a binder composition is applied onto the other face side of the sheet body, and then the coating liquid thus applied is dried and hardened.

The method for producing the underlayer light diffusion sheet of this embodiment may further include a surface treatment process in which the surface of sheet body on which the light diffusion layer is to be laminated is subjected to, before undergoing the light diffusion layer-laminating step, a corona discharge treatment, an ozone treatment, a low-temperature plasma treatment, a glow discharge treatment, an oxidization treatment, a primer coating treatment, an undercoat treatment, an anchor coating treatment, or the like.

Advantages

The method for producing the underlayer light diffusion sheet of this embodiment allows easy and reliable production of the underlayer light diffusion sheet 4 that is capable of inhibiting the creation of hot spots as described above.

Second Embodiment

Underlayer Light Diffusion Sheet

Figure 7:
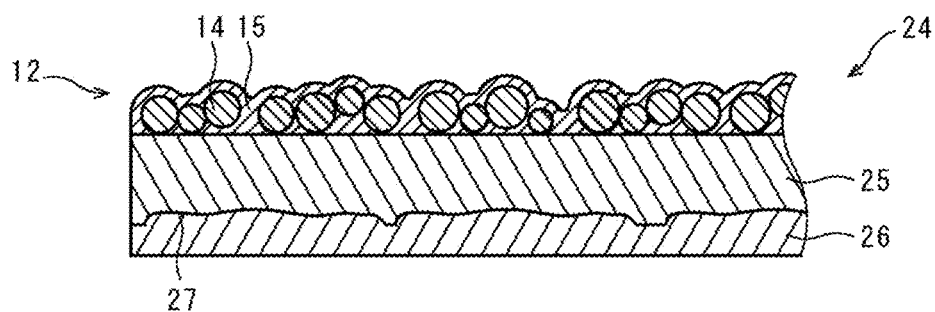
FIG. 7 is a schematic end view illustrating an optical sheet according to an embodiment different from the optical sheet illustrated in FIG. 2.

In place of the underlayer light diffusion sheet 4 illustrated in FIG. 1, an underlayer light diffusion sheet 24 illustrated in FIG. 7 may be included in the edge-lit backlight unit illustrated in FIG. 1. The underlayer light diffusion sheet 24 illustrated in FIG. 7 includes: a base film 25; the light diffusion layer 12 that is laminated on a front face side of the base film 25 and contains the beads 14 and the binder 15 for the beads 14; and a protective layer 26 laminated on a back face side of the base film 25. The underlayer light diffusion sheet 24 has a three-layer structure including the base film 25, the light diffusion layer 12 laminated directly on the front face of the base film 25, and the protective layer 26 laminated directly on the back face of the base film 25. The underlayer light diffusion sheet 24 does not include layers other than the base film 25, the light diffusion layer 12 and the protective layer 26. The underlayer light diffusion sheet 24 is formed into a rectangular shape in a planar view. The light diffusion layer 12 is similar to that of the underlayer light diffusion sheet 4 illustrated in FIG. 1, and thus is denoted by the same reference numeral and will not be further elaborated here.

Base Film

The base film 25 is a resin layer containing a synthetic resin as a principal component. Since the base film 25 needs to transmit rays of light, the base film 25 is formed from a transparent synthetic resin, particularly a colorless and transparent synthetic resin as a principal component. The principal component of the base film 25 is not particularly limited, and is exemplified by the synthetic resins similar to those exemplified in relation to the principal component of the base film 11 of the underlayer light diffusion sheet 4 illustrated in FIG. 1. The average thickness of the base film 25 may be similar to that of the base film 11 of the underlayer light diffusion sheet 4 illustrated in FIG. 1.

Ultrafine grooves 27 are provided on a back face of the protective layer 25. The ultrafine grooves 27 preferably constitute the diffraction grating. The ultrafine grooves 27 are preferably formed as hairline stripes.

The ultrafine grooves 27 are formed substantially evenly (with a substantially uniform density) on the entire back face of the base film 25. The ultrafine grooves 27 each have a substantially U-shaped cross section (in other words, the ultrafine grooves 27 each do not have a triangular cross section). The longitudinal direction of the ultrafine grooves 27 is parallel to one end of the back face of the base film 25. Specifically, the longitudinal direction of the ultrafine grooves 27 is aligned with the average direction of the rays of light emitted by the LED light sources. Furthermore, the ultrafine grooves 27 are irregular in orientation. Although the ultrafine grooves 27 are preferably provided discretely for the purpose of regulating the diffusion direction of the rays of light, some of the ultrafine grooves 27 may intersect with each other. The average orientation, the average length in the longitudinal direction, the average width, the average pitch, the standard deviation of the pitches, the number per unit length, the average depth, and the standard deviation of the depths of the ultrafine grooves 27 may be similar to those of the ultrafine grooves 16 of the underlayer light diffusion sheet 4 illustrated in FIG. 1. For the face (back face) of the base film 25 provided with the ultrafine grooves 27, the arithmetic average roughness (Ra), the maximum height (Ry), the ten-point mean roughness (Rz), and the root mean square slope (RΔq) in the direction parallel to the orientation of the ultrafine grooves 27, and the arithmetic average roughness (Ra), the maximum height (Ry), the ten-point mean roughness (Rz), and the root mean square slope (RΔq) in the direction perpendicular to the orientation of the ultrafine grooves 27 may be similar to those of the back face of the protective layer 13 of the underlayer light diffusion sheet 4 illustrated in FIG. 1.

The lower limit of the refractive index of the base film 25 is preferably 1.51, more preferably 1.53, and still more preferably 1.55. The upper limit of the refractive index of the base film 25 is preferably 1.7, more preferably 1.67, and still more preferably 1.65. In the case where there is a large difference between the refractive index of the base film 25 and the refractive index of another layer (the protective layer 26) laminated on the face (back face) of the base film 25 provided with the ultrafine grooves 27, the underlayer light diffusion sheet 24 of this embodiment is more likely to increase the amount of rays of light transmitted in the width direction of the ultrafine grooves 27. In this respect, in the case where the refractive index of the base film 25 is less than the lower limit, the difference in refractive index between the base film 25 and the protective layer 26 is not sufficiently large, leading to a failure to sufficiently increase the amount of rays of light transmitted in the width direction of the ultrafine grooves 27. Conversely, in the case where the refractive index of the base film 25 is greater than the upper limit, there may be a restriction on resins that can be used for the base film 25. The term "refractive index" as referred to herein means a refractive index for light having a wavelength of 589.3 nm (sodium D-line), which is an average of three measurements conducted at a temperature of 23° C., using a plate-like test piece of 70 mm on each side and 2 mm in thickness.

The lower limit of the difference between the refractive index of the base film 25 and the refractive index of the other layer (the protective layer 26) laminated on the face (back face) of the base film 25 provided with the ultrafine grooves 27 is preferably 0.01, more preferably 0.05, and still more preferably 0.07. In the case where the difference in refractive index is less than the lower limit, the amount of rays of light transmitted in the width direction of the ultrafine grooves 27 may not be increased sufficiently. The upper limit of the difference in refractive index may be, for example, 0.15.

Protective Layer

The protective layer 26 is a resin layer containing a synthetic resin as a principal component. The principal component of the protective layer 26 is exemplified by the synthetic resins exemplified in relation to the principal component of the protective layer 26 of the underlayer light diffusion sheet 4 illustrated in FIG. 1. The average thickness of the protective layer 26 may be similar to that of the protective layer 13 of the underlayer light diffusion sheet 4 illustrated in FIG. 1.

The lower limit of the refractive index of the protective layer 26 is preferably 1.36, more preferably 1.4, and still more preferably 1.43. The upper limit of the refractive index of the protective layer 26 is preferably 1.51, more preferably 1.5, and still more preferably 1.49. In the case where the refractive index of the protective layer 26 is less than the lower limit, there may be a restriction on resins that can be used for the protective layer 26. Conversely, in the case where the refractive index of the protective layer 26 is greater than the upper limit, the difference in refractive index between the base film 25 and the protective layer 26 is not sufficiently large, leading to a failure to sufficiently increase the amount of rays of light transmitted in the width direction of the ultrafine grooves 27.

Method for Producing Underlayer Light Diffusion Sheet

A method for producing the underlayer light diffusion sheet 24 of this embodiment includes: forming a sheet body which is to serve as the base film 25 (base film-forming step); laminating the protective layer 26 on one face side of the sheet body (protective layer-laminating step); and laminating the light diffusion layer 12 on the other face side of the sheet body (light diffusion layer-laminating step). The light diffusion layer-laminating step according to the method for producing the underlayer light diffusion sheet 24 is similar to the light diffusion layer-laminating step of the underlayer light diffusion sheet 4 illustrated in FIG. 1, and will not be further elaborated here.

Base Film-Forming Step

The base film-forming step is exemplified by an extrusion molding process in which a molten thermoplastic resin is subjected to extrusion molding using a T die, and then the shape of the ultrafine grooves 27 is transferred to one face side of the extrusion-molded article by using a mold having on the surface thereof a reversal shape of the ultrafine grooves 27. In the base film-forming step, the extrusion-molded article may be drawn in both a layer longitudinal direction and a layer width direction. Well-known extrusion molding processes employing the T die may include, for example, a polishing roll process and a chill roll process. As the mold, a metal roller or a metal plate having on the surface thereof a reversal shape of the ultrafine grooves 27 may be used. Furthermore, drawing processing of the extrusion-molded article may be exemplified by a biaxial drawing process for tubular films, a biaxial drawing process for flat films, and the like. In the base film-forming step, the extrusion-molded article is formed, and then, the ultrafine grooves 27 may be formed on one face of the extrusion-molded article by laser processing, filing, or the like, or the ultrafine grooves 27 may be formed on the sheet body by a photolithography process and an etching process.

Protective Layer-Laminating Step

The protective layer-laminating step is exemplified by a coating process in which a coating liquid containing materials for forming the protective layer is applied to one face side of the sheet body formed in the base film-forming step, and then the coating liquid is dried and hardened. The process for applying the coating liquid is exemplified by the processes exemplified in relation to the protective layer-laminating step of the underlayer light diffusion sheet 4 illustrated in FIG. 1.

Advantages

The underlayer light diffusion sheet 24 of this embodiment is capable of inhibiting the creation of hot spots. The underlayer light diffusion sheet 34 is likely to allow emission of rays of light diffused substantially uniformly over the entire face thereof.

The method for producing the underlayer light diffusion sheet of this embodiment allows easy and reliable production of the underlayer light diffusion sheet 24 that is capable of inhibiting the creation of hot spots.

Third Embodiment

Underlayer Light Diffusion Sheet

Figure 8:
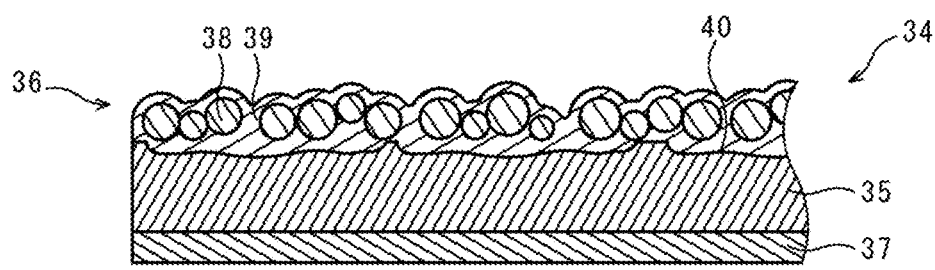
FIG. 8 is a schematic end view illustrating an optical sheet according to an embodiment different from the optical sheets illustrated in FIGS. 2 and 7.

In place of the underlayer light diffusion sheets 4 and 24 illustrated in FIGS. 1 and 7, an underlayer light diffusion sheet 34 illustrated in FIG. 8 may be included in the edge-lit backlight unit illustrated in FIG. 1. The underlayer light diffusion sheet 34 illustrated in FIG. 8 includes: a base film 35; a light diffusion layer 36 that is laminated on a front face side of the base film 35 and contains beads 38 and a binder 39 for the beads 38; and a protective layer 37 laminated on a back face side of the base film 35. The underlayer light diffusion sheet 34 has a three-layer structure including the base film 35, the light diffusion layer 36 laminated directly on the front face of the base film 35, and the protective layer 37 laminated directly on the back face of the base film 35. The underlayer light diffusion sheet 34 does not include layers other than the base film 35, the light diffusion layer 36 and the protective layer 37. The underlayer light diffusion sheet 34 is formed into a rectangular shape in a planar view.

Base Film

The base film 35 is a resin layer containing a synthetic resin as a principal component. Since the base film 35 needs to transmit rays of light, the base film 35 is formed from a transparent synthetic resin, particularly a colorless and transparent synthetic resin as a principal component. The principal component of the base film 35 is not particularly limited, and is exemplified by the synthetic resins similar to those exemplified in relation to the principal component of the base film 11 of the underlayer light diffusion sheet 4 illustrated in FIG. 1. The average thickness of the base film 35 may be similar to that of the base film 11 of the underlayer light diffusion sheet 4 illustrated in FIG. 1.

Ultrafine grooves 40 are provided on the front face of the base film 35. The ultrafine grooves 40 preferably constitute the diffraction grating. A specific constitution of the ultrafine grooves 40 may be similar to that of the ultrafine grooves 27 of the underlayer light diffusion sheet 24 illustrated in FIG. 7. In other words, the front face of the base film 35 of the underlayer light diffusion sheet 34 of this embodiment is formed similarly to the back face of the underlayer light diffusion sheet 24 illustrated in FIG. 7.

The refractive index of the base film 35 may be similar to that of the base film 25 of the underlayer light diffusion sheet 24 illustrated in FIG. 7. The difference between the refractive index of the base film 35 and the refractive index of the binder 39 of the light diffusion layer 36 may be similar to the difference in refractive index between the base film 25 and the protective layer 26 of the underlayer light diffusion sheet 24 illustrated in FIG. 7.

Light Diffusion Layer

The light diffusion layer 36 is a resin layer containing a synthetic resin as a principal component. The light diffusion layer 36 constitutes the frontmost face of the underlayer light diffusion sheet 34. The light diffusion layer 36 contains the beads 38 in a dispersion state with a substantially uniform density. The beads 38 are surrounded by the binder 39. The light diffusion layer 36 in which the beads 38 are contained in a dispersion state is capable of diffusing, substantially uniformly, rays of light transmitted from the back face side to the front face side. In addition, due to the beads 38, ultrafine projections and recesses are provided substantially uniformly on the front face of the light diffusion layer 36, and the individual protruding portions and the individual recessed portions of the ultrafine projections and recesses are lens-shaped. The light diffusion layer 36 performs, owing to a lens-like effect of the ultrafine projections and recesses, a superior light diffusion function, and thus has, owing to its light diffusion function, both the function of refracting transmitted rays of light toward the normal direction and the function of condensing the transmitted rays of light macroscopically into the normal direction.

The principal component of the beads 38 may be similar to that of the beads 14 of the underlayer light diffusion sheet 4 illustrated in FIG. 1. The shape, the mean particle diameter and the content of the beads 38 may be similar to those of the beads of the underlayer light diffusion sheet 4 illustrated in FIG. 1.

The binder 39 is prepared by hardening (through crosslinking, etc.) a polymer composition containing a base polymer. The binder 39 allows the beads 38 to be arranged and fixed with a substantially uniform density on the entire front face of the base film 35.

The lower limit of the refractive index of the binder 39 is preferably 1.36, more preferably 1.4, and still more preferably 1.43. The upper limit of the refractive index of the binder 39 is preferably 1.7, more preferably 1.6, still more preferably 1.55, and even more preferably 1.49. In the case where the refractive index of the protective layer 39 is less than the lower limit, there may be a restriction on resins that can be used for the binder 39. Conversely, in the case where the refractive index of the protective layer 39 is greater than the upper limit, the difference in refractive index between the base film 25 and the binder 39 is not sufficiently large, leading to a failure to sufficiently increase the amount of rays of light transmitted in the width direction of the ultrafine grooves 40.

Protective Layer

The protective layer 37 is a resin layer containing a synthetic resin as a principal component. The back face of the protective layer 37 is formed into a flat surface. The principal component of the protective layer 37 is exemplified by the synthetic resins exemplified in relation to the principal component of the protective layer 13 of the underlayer light diffusion sheet 4 illustrated in FIG. 1. The average thickness of the protective layer 37 may be similar to that of the protective layer 13 of the underlayer light diffusion sheet 4 illustrated in FIG. 1.

Method for Producing Underlayer Light Diffusion Sheet

A method for producing the underlayer light diffusion sheet 34 of this embodiment includes: forming a sheet body which is to serve as the base film 35 (base film-forming step); laminating the protective layer 37 on one face side of the sheet body (protective layer-laminating step); and laminating the light diffusion layer 36 on the other face side of the sheet body (light diffusion layer-laminating step). The method for producing this underlayer light diffusion sheet of this embodiment may be similar to the method for producing the underlayer light diffusion sheet 24 illustrated in FIG. 7, except that in the base film-forming step, the ultrafine grooves 40 are not formed on one face side of the extrusion-molded article and the ultrafine grooves 40 are formed on the other face side of the extrusion-molded article.

Advantages

The underlayer light diffusion sheet 34 of this embodiment is capable of inhibiting the creation of hot spots. The underlayer light diffusion sheet 34 is likely to allow emission of rays of light diffused substantially uniformly over the entire face thereof.

The method for producing the underlayer light diffusion sheet of this embodiment allows easy and reliable production of the underlayer light diffusion sheet 34 that is capable of inhibiting the creation of hot spots.

Fourth Embodiment

Underlayer Light Diffusion Sheet

Figure 9:
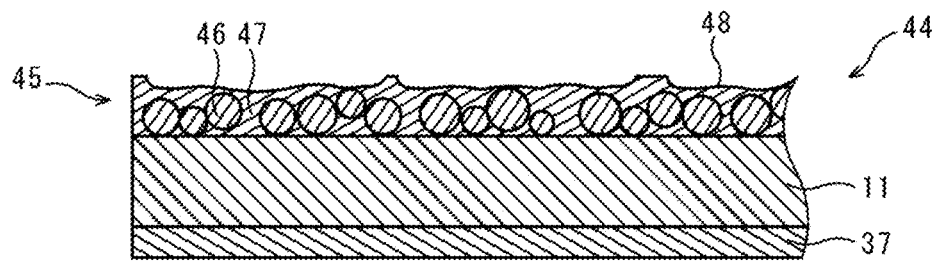
FIG. 9 is a schematic end view illustrating an optical sheet according to an embodiment different from the optical sheets illustrated in FIGS. 2, 7 and 8.

In place of the underlayer light diffusion sheets 4, 24 and 34 illustrated in FIGS. 1, 7 and 8, an underlayer light diffusion sheet 44 illustrated in FIG. 9 may be included in the edge-lit backlight unit illustrated in FIG. 1. The underlayer light diffusion sheet 44 illustrated in FIG. 9 includes: the base film 11; a light diffusion layer 45 that is laminated on the front face side of the base film 11 and contains beads 46 and a binder 47 for the beads 46; and the protective layer 37 laminated on the back face side of the base film 11. The underlayer light diffusion sheet 44 of this embodiment has a three-layer structure including the base film 11, the light diffusion layer 45 laminated directly on the front face of the base film 11, and the protective layer 37 laminated directly on the back face of the base film 11. The underlayer light diffusion sheet 44 does not include layers other than the base film 11, the light diffusion layer 45 and the protective layer 37. The underlayer light diffusion sheet 44 is formed into a rectangular shape in a planar view. The base film 11 of the underlayer light diffusion sheet 44 has a configuration similar to that of the base film 11 of the underlayer light diffusion sheet 4 illustrated in FIG. 1, and the protective layer 37 of the underlayer light diffusion sheet 44 has a configuration similar to that of the protective layer 37 of the underlayer light diffusion sheet 34 illustrated in FIG. 8, and thus, these components are denoted by the same reference numerals and will not be further elaborated here.

Light Diffusion Layer

The light diffusion layer 45 is a resin layer containing a synthetic resin as a principal component. The light diffusion layer 45 constitutes the frontmost face of the underlayer light diffusion sheet 44. The light diffusion layer 45 contains the beads 46 in a dispersion state with a substantially uniform density. The beads 46 are surrounded by the binder 47. The light diffusion layer 45 in which the beads 46 are contained in a dispersion state is capable of diffusing, substantially uniformly, rays of light transmitted from the back face side to the front face side. In addition, due to the beads 46, ultrafine projections and recesses are provided substantially uniformly on the front face of the light diffusion layer 45. The light diffusion layer 45 performs, owing to a lens-like effect of the ultrafine projections and recesses, a superior light diffusion function, and thus has, owing to its light diffusion function, both the function of refracting transmitted rays of light toward the normal direction and the function of condensing the transmitted rays of light macroscopically into the normal direction. Furthermore, ultrafine grooves 48 are provided on the front face of the light diffusion layer 45. In other words, the ultrafine grooves 48 of this embodiment are provided on the face of the underlayer light diffusion sheet 44 provided with the ultrafine projections and recesses. In the case the ultrafine grooves 48 are provided on the face of the underlayer light diffusion sheet 44 provided with the ultrafine projections and recesses, the ultrafine grooves 48 enable transmission of the rays of light in the width direction of the ultrafine grooves 48, and the ultrafine projections and recesses enable diffusion of the rays of light. This enables improvements in the effects of, for example, preventing moire, preventing color separation, and expanding the viewing angle. The ultrafine grooves 48 preferably constitute the diffraction grating. A specific constitution of the ultrafine grooves 48 may be similar to that of the ultrafine grooves 16 of the underlayer light diffusion sheet 4 illustrated in FIG. 1. The "ultrafine projections and recesses" as referred to herein means the state in which the arithmetic average roughness (Ra) is, for example, no less than 1.0 μm, preferably no less than 1.5 μm, and still more preferably 2.0 μm.

The principal component of the beads 46 may be similar to that of the beads 14 of the underlayer light diffusion sheet 4 illustrated in FIG. 1. The shape, the mean particle diameter and the content of the beads 46 may be similar to those of the beads of the underlayer light diffusion sheet 4 illustrated in FIG. 1. In addition, the binder 47 is prepared by hardening (through crosslinking, etc.) a polymer composition containing a base polymer similar to that for the binder 15 of the underlayer light diffusion sheet 1 illustrated in FIG. 1.

Method for Producing Underlayer Light Diffusion Sheet

A method for producing the underlayer light diffusion sheet 44 of this embodiment includes: forming a sheet body which is to serve as the base film 11 (base film-forming step); laminating the protective layer 37 on one face side of the sheet body (protective layer-laminating step); and laminating the light diffusion layer 45 on the other face side of the sheet body (light diffusion layer-laminating step). The base film-forming step according to the method for producing the underlayer light diffusion sheet 44 is similar to the base film-forming step of the underlayer light diffusion sheet 4 illustrated in FIG. 1, and the protective layer-laminating step according to the method for producing the underlayer light diffusion sheet 44 is similar to the protective layer-laminating step of the underlayer light diffusion sheet 24 illustrated in FIG. 7, and thus, these steps will not be further elaborated here.

Light Diffusion Layer-Laminating Step

The light diffusion layer-laminating step is exemplified by a process in which a coating liquid containing the beads 46 and a binder composition is applied to the other face side of the sheet body formed in the base film-forming step, and then the shape of the ultrafine grooves 48 is transferred to one face side of a coating film obtained by the application of the coating liquid, by using a mold having on the surface thereof a reversal shape of the ultrafine grooves 48. In the light diffusion layer-laminating step, a mold having on the surface thereof the shape of ultrafine projections and recesses in addition to the reversal shape of the ultrafine grooves 48 may be used. In the case where the mold having on the surface thereof the shape of the ultrafine projections and recesses is used in the light diffusion layer-laminating step, ultrafine projections and recesses are formed on the front face of the light diffusion layer 45. The light diffusion layer 45 performs, owing to a lens-like effect of the ultrafine projections and recesses, a superior light diffusion function, and thus has, owing to its light diffusion function, both the function of refracting transmitted rays of light toward the normal direction and the function of condensing the transmitted rays of light macroscopically into the normal direction. The process for applying the coating liquid is exemplified by the processes exemplified in relation to the protective layer-laminating step of the underlayer light diffusion sheet 4 illustrated in FIG. 1. As the mold, a metal roller or a metal plate having on the surface thereof a reversal shape of the ultrafine grooves 48 may be used as in the protective layer-laminating step of the underlayer light diffusion sheet 4 illustrated in FIG. 1. In the light diffusion layer-laminating step, the coating film may be dried as needed. In the light diffusion layer-laminating step, the coating liquid applied to the other face side of the base film is hardened, and then, the ultrafine grooves 48 may be formed by laser processing, filing, or the like, on the other face having the coating liquid hardened thereon.

Advantages

The underlayer light diffusion sheet 44 of this embodiment is capable of inhibiting the creation of hot spots. The underlayer light diffusion sheet 44 is likely to allow emission of rays of light diffused substantially uniformly over the entire face thereof. In general, the diffraction effect of the backlight unit associated with the diffraction grating increasingly becomes noticeable as the distance between the LED light sources and the diffraction grating increases. In the case where the diffraction grating is formed on the front face of the light diffusion layer 9 constituting the frontmost face of the underlayer light diffusion sheet 44, a reduction in the lack in uniformity of luminance of the liquid crystal display device is enabled more reliably.

The method for producing the underlayer light diffusion sheet of this embodiment allows easy and reliable production of the underlayer light diffusion sheet 44 of this embodiment that is capable of inhibiting the creation of hot spots.

Fifth Embodiment

Underlayer Light Diffusion Sheet

Figure 10:
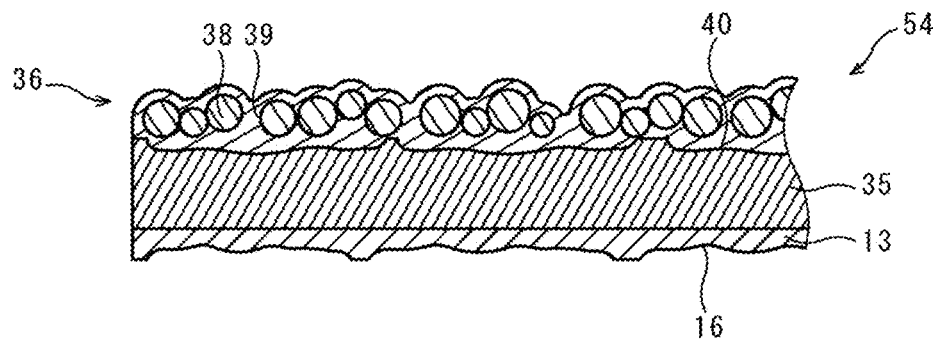
FIG. 10 is a schematic end view illustrating an optical sheet according to an embodiment different from the optical sheets illustrated in FIG. 2 and FIGS. 7 to 9.

In place of the underlayer light diffusion sheets 4, 24, 34, and 44 illustrated in FIG. 1 and FIGS. 7 to 9, an underlayer light diffusion sheet 54 illustrated in FIG. 10 may be included in the edge-lit backlight unit illustrated in FIG. 1. The underlayer light diffusion sheet 54 illustrated in FIG. 10 includes: the base film 35; the light diffusion layer 36 that is laminated on the front face side of the base film 35 and contains the beads 38 and the binder 39 for the beads 38; and the protective layer 13 laminated on the back face side of the base film 35. The underlayer light diffusion sheet 54 has a three-layer structure including the base film 35, the light diffusion layer 36 laminated directly on the front face of the base film 35, and the protective layer 13 laminated directly on the back face of the base film 35. The underlayer light diffusion sheet 54 does not include layers other than the base film 35, the light diffusion layer 36 and the protective layer 13. The underlayer light diffusion sheet 54 is formed into a rectangular shape in a planar view. The base film 35 and the light diffusion layer 36 of the underlayer light diffusion sheet 54 of this embodiment respectively have configurations similar to those of the base film 35 and the light diffusion layer 36 of the underlayer light diffusion sheet 34 illustrated in FIG. 8, and the protective layer 13 of the underlayer light diffusion sheet 54 has a configuration similar to that of the protective layer 13 of the underlayer light diffusion sheet 4 illustrated in FIG. 1. In other words, ultrafine grooves are provided on resin layers of the underlayer light diffusion sheet 54. Specifically, ultrafine grooves are provided on two layers, namely, the base film 35 and the protective layer 13.

Method for Producing Underlayer Light Diffusion Sheet

A method for producing the underlayer light diffusion sheet 54 of this embodiment includes: forming a sheet body which is to serve as the base film 35 (base film-forming step); laminating the protective layer 13 on one face side of the sheet body (protective layer-laminating step); and laminating the light diffusion layer 36 on the other face side of the sheet body (light diffusion layer-laminating step). The base film-forming step and the light diffusion layer-laminating step according to the method for producing the underlayer light diffusion sheet 54 may be similar to the base film-forming step and the light diffusion layer-laminating step of the underlayer light diffusion sheet 34 illustrated in FIG. 8. The protective layer-laminating step according to the method for producing the underlayer light diffusion sheet 54 may be similar to the protective layer-laminating step of the underlayer light diffusion sheet 4 illustrated in FIG. 1.

Advantages

The underlayer light diffusion sheet 54 of this embodiment, in which ultrafine grooves are provided on the two resin layers, is capable of inhibiting the creation of hot spots more reliably. The underlayer light diffusion sheet 54 is likely to allow emission of rays of light diffused substantially uniformly over the entire face thereof.

Sixth Embodiment

Underlayer Light Diffusion Sheet

Figure 11:
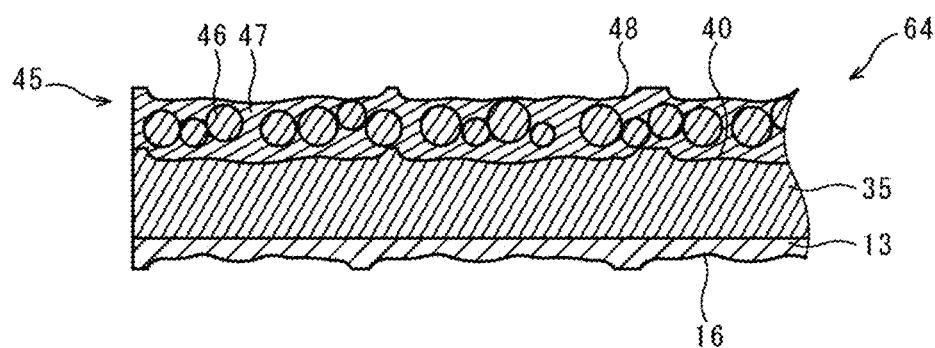
FIG. 11 is a schematic end view illustrating an optical sheet according to an embodiment different from the optical sheets illustrated in FIG. 2 and FIGS. 7 to 10.

In place of the underlayer light diffusion sheets 4, 24, 34, 44 and 54 illustrated in FIG. 1 and FIGS. 7 to 10, an underlayer light diffusion sheet 64 illustrated in FIG. 11 may be included in the edge-lit backlight unit illustrated in FIG. 1. The underlayer light diffusion sheet 64 illustrated in FIG. 11 includes: the base film 35; the light diffusion layer 45 that is laminated on the front face side of the base film 35 and contains the beads 46 and the binder 47 for the beads 46; and the protective layer 13 laminated on the back face side of the base film 35. The underlayer light diffusion sheet 64 has a three-layer structure including the base film 35, the light diffusion layer 45 laminated directly on the front face of the base film 35, and the protective layer 13 laminated directly on the back face of the base film 35. The underlayer light diffusion sheet 64 does not include layers other than the base film 35, the light diffusion layer 45 and the protective layer 13. The underlayer light diffusion sheet 64 is formed into a rectangular shape in a planar view. The base film 35 of the underlayer light diffusion sheet 64 of this embodiment has a configuration similar to that of the base film 35 of the underlayer light diffusion sheet 34 illustrated in FIG. 8. The light diffusion layer 45 of the underlayer light diffusion sheet 64 has a configuration similar to that of the light diffusion layer 45 of the underlayer light diffusion sheet 44 illustrated in FIG. 9. The protective layer 13 of the underlayer light diffusion sheet 64 has a configuration similar to that of the protective layer 13 of the underlayer light diffusion sheet 4 illustrated in FIG. 1. In other words, ultrafine grooves are provided on resin layers of the underlayer light diffusion sheet 64. Specifically, ultrafine grooves are provided on three layers, namely, the base film 35, the light diffusion layer 45 and the protective layer 13.

Method for Producing Underlayer Light Diffusion Sheet

A method for producing the underlayer light diffusion sheet 64 of this embodiment includes: forming a sheet body which is to serve as the base film 35 (base film-forming step); laminating the protective layer 13 on one face side of the sheet body (protective layer-laminating step); and laminating the light diffusion layer 45 on the other face side of the sheet body (light diffusion layer-laminating step). The base film-forming step according to the method for producing the underlayer light diffusion sheet 64 may be similar to the base film-forming step of the underlayer light diffusion sheet 34 illustrated in FIG. 8. The protective layer-laminating step according to the method for producing the underlayer light diffusion sheet 64 may be similar to the protective layer-laminating step of the underlayer light diffusion sheet 4 illustrated in FIG. 1. The light diffusion layer-laminating step according to the method for producing the underlayer light diffusion sheet 64 may be similar to the light diffusion layer-laminating step of the underlayer light diffusion sheet 44 illustrated in FIG. 9.

Advantages

The underlayer light diffusion sheet 64 of this embodiment, in which ultrafine grooves are provided on the three resin layers, is capable of inhibiting the creation of hot spots more reliably. The underlayer light diffusion sheet 64 is likely to allow emission of rays of light diffused substantially uniformly over the entire face thereof.

Seventh Embodiment

Underlayer Light Diffusion Sheet

Figure 12:
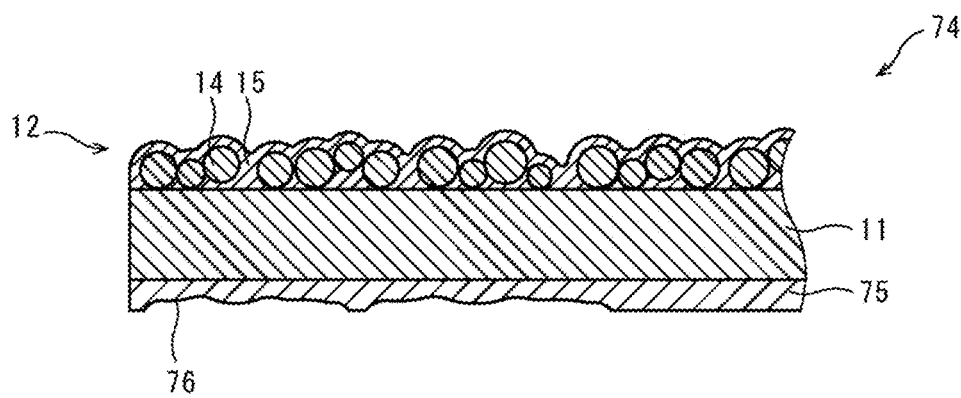
FIG. 12 is a schematic end view illustrating an optical sheet according to an embodiment different from the optical sheets illustrated in FIG. 2 and FIGS. 7 to 11.
Figure 13:
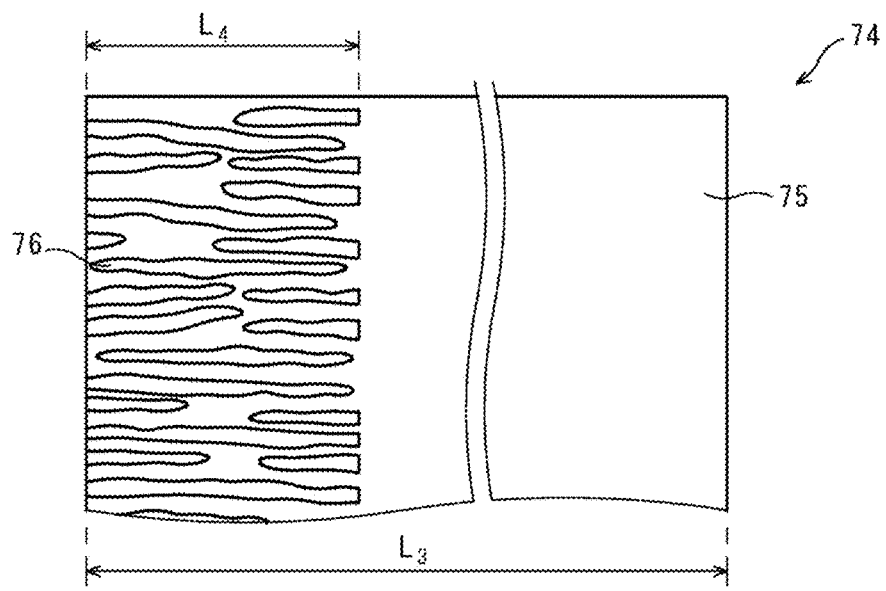
FIG. 13 is a schematic enlarged rear view of the optical sheet illustrated in FIG. 12.

In place of the underlayer light diffusion sheets 4, 24, 34, 44, 54 and 64 illustrated in FIG. 1 and FIGS. 7 to 11, an underlayer light diffusion sheet 74 illustrated in FIGS. 12 and 13 may be included in the edge-lit backlight unit illustrated in FIG. 1. The underlayer light diffusion sheet 74 illustrated in FIG. 12 includes: the base film 11; the light diffusion layer 12 that is laminated on the front face side of the base film 11 and contains the beads 14 and the binder 15 for the beads 14; and the protective layer 75 laminated on the back face side of the base film 11. The underlayer light diffusion sheet 74 has a three-layer structure including the base film 11, the light diffusion layer 12 laminated directly on the front face of the base film 11, and the protective layer 75 laminated directly on the back face of the base film 11. The underlayer light diffusion sheet 74 does not include layers other than the base film 11, the light diffusion layer 12 and the protective layer 75. The underlayer light diffusion sheet 74 is formed into a rectangular shape in a planar view. The base film 11 and the light diffusion layer 12 of the underlayer light diffusion sheet 74 of this embodiment are similar to the base film 11 and the light diffusion layer 12 of the light diffusion sheet 4 illustrated in FIG. 1, and thus these components are denoted by the same reference numerals and will not be further elaborated here.

Protective Layer

The protective layer 75 is a resin layer containing a synthetic resin as a principal component. The principal component of the protective layer 75 is exemplified by the synthetic resins exemplified in relation to the principal component of the protective layer 13 of the underlayer light diffusion sheet 4 illustrated in FIG. 1. The average thickness of the protective layer 75 may be similar to that of the protective layer 13 of the underlayer light diffusion sheet 4 illustrated in FIG. 1.

Ultrafine grooves 76 are provided on the back face of the protective layer 75. The ultrafine grooves 76 are provided on a certain region extending from one end to the other end of the back face of the protective layer 75. Specifically, the ultrafine grooves 76 are provided on the certain region extending from the edge opposed to the LED light sources to the other end of the protective layer 75 in a planar view. The region of the back face of the protective layer 75 that is not provided with the ultrafine grooves 76 constitutes a flat surface. The ultrafine grooves 76 each have a substantially U-shaped cross section (in other words, the ultrafine grooves 76 each do not have a triangular cross section). The ultrafine grooves 76 preferably constitute the diffraction grating.

The lower limit of the ratio ($L_4/L_3$) of a length $L_4$ between one end and the other end of the region provided with the ultrafine grooves 76, to a length $L_3$ between one end and the other end of the back face of the protective layer 75, is preferably 0.15, more preferably 0.2, and still more preferably 0.25. The upper limit of the length ratio ($L_4/L_3$) is preferably 0.5, more preferably 0.45, and still more preferably 0.4. In the case where the length ratio ($L_4/L_3$) is less than the lower limit, it may be difficult to entirely inhibit the creation of hot spots. Conversely, in the case where the length ratio ($L_4/L_3$) is greater than the upper limit, it may be difficult to transmit, in the width direction of the ultrafine grooves 76, ray of light in the region other than the hot spots.

The longitudinal direction of the ultrafine grooves 76 is parallel to one end of the back face of the protective layer 75. Specifically, the longitudinal direction of the ultrafine grooves 76 is aligned with the average direction of the rays of light emitted by the LED light sources. Furthermore, the ultrafine grooves 76 are irregular in orientation. Although the ultrafine grooves 76 are preferably provided discretely for the purpose of regulating the diffusion direction of the rays of light, some of the ultrafine grooves 76 may intersect with each other. The average orientation, the average length in the longitudinal direction, the average width, the average pitch, the standard deviation of the pitches, the average number per unit length, the average depth, and the standard deviation of the depths of the ultrafine grooves 76 may be similar to those of the ultrafine grooves 16 of the underlayer light diffusion sheet 4 illustrated in FIG. 1. For the face (back face) of the protective layer 75 provided with the ultrafine grooves 76, the arithmetic average roughness (Ra), the maximum height (Ry), the ten-point mean roughness (Rz), and the root mean square slope (R$\Delta$q) in the direction parallel to the orientation of the ultrafine grooves 76, and the arithmetic average roughness (Ra), the maximum height (Ry), the ten-point mean roughness (Rz), and the root mean square slope (R$\Delta$q) in the direction perpendicular to the orientation of the ultrafine grooves 27 may be similar to those of the back face of the protective layer 13 of the underlayer light diffusion sheet 4 illustrated in FIG. 1.

Method for Producing Underlayer Light Diffusion Sheet

The method for producing the underlayer light diffusion sheet 74 of this embodiment may be similar to the method for producing the underlayer light diffusion sheet 4 illustrated in FIG. 1.

Advantages

The underlayer light diffusion sheet 74 of this embodiment, in which the ultrafine grooves 76 are provided on the certain region extending from one end to the other end of the back face of the protective layer 75, is capable of inhibiting the creation of hot spots. The underlayer light diffusion sheet 74, in which the region of the back face of the protective layer 75 that is not provided with the ultrafine grooves 76 is a flat surface, is capable of inhibiting an increase in the amount of rays of light transmitted in the width direction of the ultrafine grooves 76, in the region other than the hot spots. The underlayer light diffusion sheet 74 is likely to allow emission of rays of light diffused substantially uniformly over the entire face thereof.

Other Embodiments

It is to be noted that the optical sheet for a backlight unit and the backlight unit according to the embodiments of the present invention may be employed in various modified or improved modes other than those described above. For example, in place of the light guide film mentioned above, a light guide plate may be included in the backlight unit of each of the embodiments. It is not always required that the optical sheet for a backlight unit is the underlayer light diffusion sheet of each of the embodiments. The optical sheet may be, for example, the light guide film, the prism sheet, the upper-layer light diffusion sheet or the reflection sheet illustrated in FIG. 1, or may be a light guide plate. In other words, ultrafine grooves oriented in the specific directions may be provided on the front face side or the back face side of the resin layer of the light guide film, the prism sheet, the upper-layer light diffusion sheet or the reflection sheet mentioned above, or may be provided on the front face side or the back face side of the resin layer of the light guide plate. In the case where the optical sheet for a backlight unit of the embodiment is the upper-layer light diffusion sheet and the ultrafine grooves constitute the diffraction grating, the diffraction effect associated with the diffraction grating is likely to be improved owing to the increased distance between the LED light sources and the diffraction grating. Thus, in the case where the optical sheet for a backlight unit of the embodiment is the upper-layer light diffusion sheet, the lack in uniformity of luminance of the liquid crystal display device is likely to be reduced more reliably. In the case where the optical sheet for a backlight unit of the embodiment is the upper-layer light diffusion sheet, the configuration of the portion provided with the ultrafine grooves and the configuration of the ultrafine grooves may be similar to those described in relation to the underlayer light diffusion sheet.

It is preferred that optical sheet for a backlight unit of each of the embodiments is disposed on the back face of a sheet body including two prism sheets bonded to each other. The sheet body including two prism sheets bonded to each other is inferior in masking properties due to an air layer being less likely to be formed between the prism sheets. Meanwhile, in the case where the optical sheet for a backlight unit of the embodiment is disposed on the back face of the sheet body, the optical sheet is capable of diffusing a greater amount of rays of light in the width direction of the ultrafine grooves, whereby the backlight unit is enabled to provide a sufficient improvement of masking properties.

In the case where the optical sheet for a backlight unit of the embodiment is a light diffusion sheet (the underlayer light diffusion sheet or the upper-layer light diffusion sheet), the ultrafine grooves may be provided on the back face of the light diffusion layer and/or on the front face of the protective layer. Alternatively, the ultrafine grooves may be provided on freely-selected front faces and/or back faces of the resin layers.

A freely-selected resin layer of the optical sheet for a backlight unit of the embodiment may have a certain region provided with the ultrafine grooves. For example, in the case where the optical sheet for a backlight unit of the embodiment is a light diffusion sheet, at least any one of the front face and/or the back face of the base film, the front face and/or the back face of the light diffusion layer, and/or the front face and/or the back face of the protective layer may have such a region provided with the ultrafine grooves. Any two of the base film, the light diffusion layer and the protective layer may have such a region provided with the ultrafine grooves, or the base film, the light diffusion layer and the protective layer may each have such a region provided with the ultrafine grooves.

Figure 14:
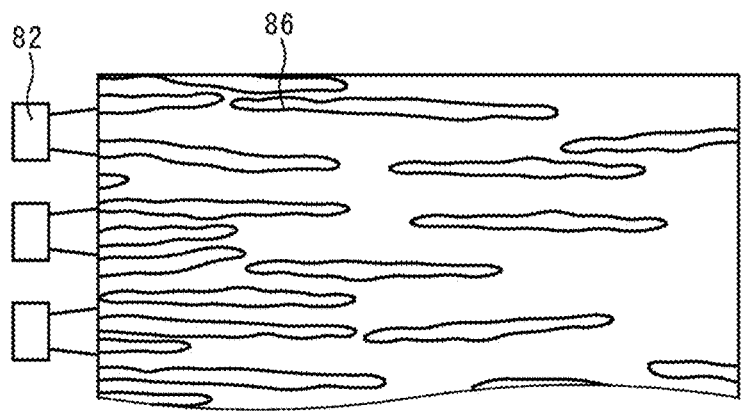
FIG. 14 is a schematic enlarged rear view for describing ultrafine grooves of an optical sheet according to an embodiment different from the optical sheets illustrated in FIG. 2 and FIGS. 7 to 12.

The ultrafine grooves may be provided as illustrated in, for example, FIG. 14. The ultrafine grooves 86 illustrated in FIG. 14 are provided on the front face and/or the back face of the resin layer in such a manner that the number of ultrafine grooves gradually decreases from the edge opposed to LED light sources 82 to the other edge. Such a configuration also enables the optical sheet for a backlight unit of the embodiment to inhibit the creation of hot spots. The configuration in which the number of the ultrafine grooves 86 gradually decreases from the edge opposed to the LED light sources 82 to the other edge enables the optical sheet for a backlight unit to reduce the amount of rays of light transmitted in the width direction of the ultrafine grooves 86, in the region other than the hot spots. The average orientation, the average length in the longitudinal direction, the average width, the average pitch, the standard deviation of the pitches, the average number per unit length, the average depth, and the standard deviation of the depths of the ultrafine grooves 86 may be similar to those of the ultrafine grooves 16 of the underlayer light diffusion sheet 4 illustrated in FIG. 1. For the face of the resin layer provided with the ultrafine grooves 86, the arithmetic average roughness (Ra), the maximum height (Ry), the ten-point mean roughness (Rz), and the root mean square slope (RΔq) in the direction parallel to the orientation of the ultrafine grooves 86, and the arithmetic average roughness (Ra), the maximum height (Ry), the ten-point mean roughness (Rz), and the root mean square slope (RΔq) in the direction perpendicular to the orientation of the ultrafine grooves 27 may be similar to those of the back face of the protective layer 13 of the underlayer light diffusion sheet 4 illustrated in FIG. 1.

The configuration of the light diffusion sheet is not limited to the aforementioned three-layer structure including the base film, the light diffusion layer and the protective layer. For example, another layer may be disposed between the base film and the light diffusion layer, and/or between the base film and the protective layer.

In place of the protective layer, a sticking preventive layer in which beads are dispersed in a resin matrix may be included in the light diffusion sheet. Ultrafine grooves may be provided on the sticking preventive layer. It is not always required that the light diffusion layer includes the protective layer.

The light diffusion layer of the light diffusion sheet does not need to contain beads and a binder for the beads. Alternatively, the front face of the resin layer may be embossed. In addition, ultrafine grooves may be provided on the face provided with ultrafine projections and recesses formed by embossing.

The optical sheet for a backlight unit of each of the embodiments may include a functional layer having on the front face thereof projections and recesses. In the case where such a functional layer is included in the optical sheet for a backlight unit of the embodiment, the functional layer may be a resin layer, and ultrafine grooves may be provided on the front face or the back face of the functional layer. Ultrafine grooves may be provided on the front face or the back face of another layer laminated on the functional layer. The projections and recesses may be shaped into embossments, prisms, waves, or the like.

Figure 15:
FIG. 15 is a schematic end view illustrating ultrafine grooves according to another embodiment of the present invention.
Figure 16:
FIG. 16 is a schematic end view illustrating ultrafine grooves according to an embodiment different from the ultrafine grooves illustrated in FIG. 15.
Figure 17:
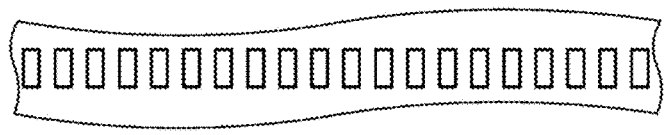
FIG. 17 is a schematic end view illustrating ultrafine grooves according to an embodiment different from the ultrafine grooves illustrated in FIGS. 15 and 16.
Figure 18:
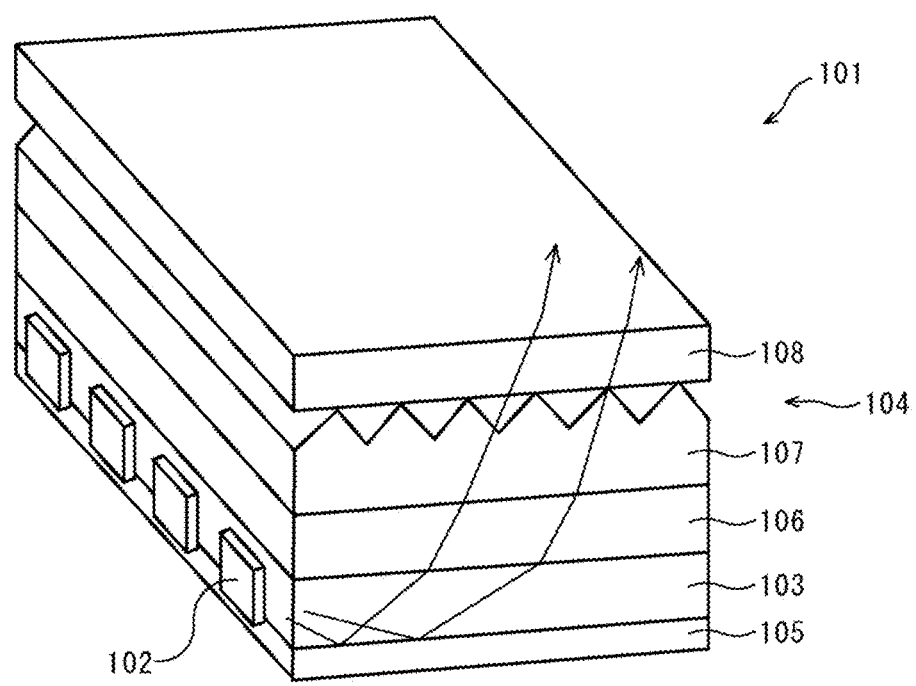
FIG. 18 is a schematic perspective view illustrating a conventional edge-lit backlight unit.

The specific shape of the ultrafine grooves is not limited to the shapes mentioned in the embodiments describe above, and may be, for example, a shape having a squared U-shape cross section as illustrated in FIG. 15, a shape having a triangular cross section as illustrated in FIG. 16, and a slit-like shape as illustrated in FIG. 17.

Although the backlight unit of the embodiment preferably includes a plurality of LED light sources, the backlight may include only one LED light source. The specific kind of the optical sheet of the backlight unit is not particularly limited. Although the backlight unit preferably includes a plurality optical sheets on the front face side of the light guide film, the backlight unit may include only one optical sheet.

The backlight unit of the embodiment is not necessarily an edge-lit backlight unit, and may be, for example, a direct-lit backlight unit.

The backlight unit of the embodiment may be included in a comparatively large-sized visual display unit such as a personal computer or a liquid crystal television, or may be included in a mobile phone terminal such as a smartphone or a personal digital assistance such as a tablet terminal.

EXAMPLES

Hereinafter, the embodiments of the present invention will be described in more detail by way of Examples; however, the present invention is not in any way limited to these Examples.

No. 1

Figure 19:
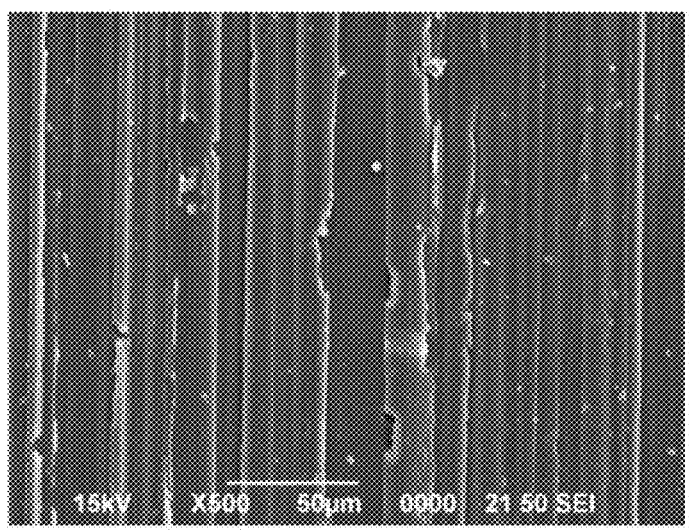
FIG. 19 is a partial enlarged photograph of a plane surface of the base film of No. 1.

A resin that was for forming a base film and contained polyethylene terephthalate as a principal component was subjected to extrusion molding using a T die, and then the shape of ultrafine grooves was transferred to one face of the extrusion-molded article by using a mold having on the surface thereof a reversal shape of the ultrafine grooves, whereby a base film having an average thickness of 75 µm was produced. Then, a light diffusion layer containing beads and a binder was laminated on the face of the base film provided with the ultrafine grooves, whereby the light diffusion sheet of No. 1 was obtained. In the light diffusion sheet, the difference between the refractive index of the base film and the refractive index of the binder was 0.09. As to the light diffusion sheet, the average width of the ultrafine grooves was 9.3 µm, the average depth thereof was 2.8 µm, the average pitch thereof was 9.3 µm, the standard deviation of the pitches of the ultrafine grooves was 6.54 µm, the standard deviation of the depths of the ultrafine grooves was 1.13 µm, and the arithmetic average roughness (Ra) in the direction perpendicular to the orientation of the ultrafine grooves was 1.34 µm. FIG. 19 is a partial enlarged photograph of a plane surface of the base film of No. 1.

No. 2

Figure 20:
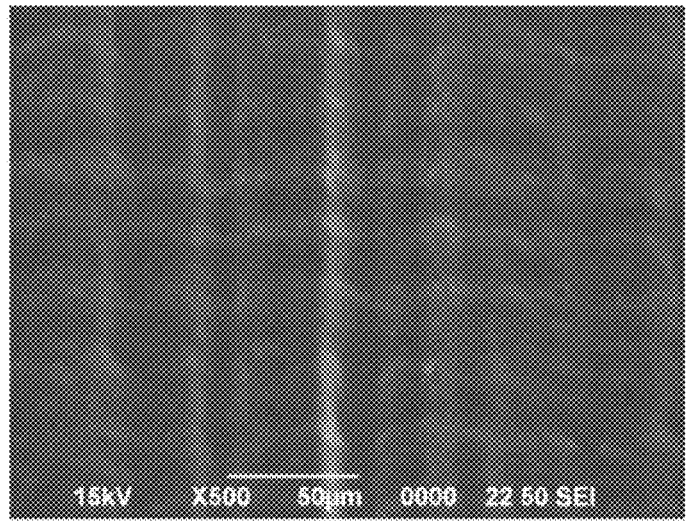
FIG. 20 is a partial enlarged photograph of a plane surface of the base film of No. 2.

A sheet body having an average thickness of 75 µm was formed by using a resin similar to the resin used in No. 1. Then, ultrafine grooves were formed on one face of the sheet body by laser processing, whereby a base film was produced. Subsequently, a light diffusion layer containing beads and a binder similar to those used in No. 1 was laminated on the face of the base film provided with the ultrafine grooves, whereby the light diffusion sheet of No. 2 was obtained. As to the light diffusion sheet, the average width of the ultrafine grooves was 26.9 µm, the average depth thereof was 6.44 µm, the average pitch thereof was 26.9 µm, the standard deviation of the pitches of the ultrafine grooves was 5.56 µm, the standard deviation of the depths of the ultrafine grooves was 2.38 µm, and the arithmetic average roughness (Ra) in the direction perpendicular to the orientation of the ultrafine grooves was 0.92 µm. FIG. 20 is a partial enlarged photograph of a plane surface of the base film of No. 2.

No. 3

Figure 21:
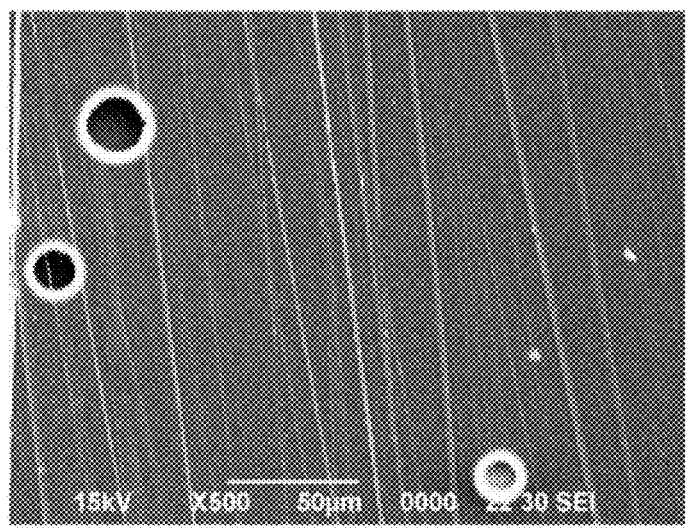
FIG. 21 is a partial enlarged photograph of a plane surface of the base film of No. 3.

A sheet body having an average thickness of 75 µm was formed by using a resin similar to the resin used in No. 1. Then, ultrafine grooves were formed on one face of the sheet body by filing, whereby a base film was produced. Subsequently, a light diffusion layer containing beads and a binder similar to those used in No. 1 was laminated on the face of the base film provided with the ultrafine grooves, whereby the light diffusion sheet of No. 3 was obtained. As to the light diffusion sheet, the average width of the ultrafine grooves was 1.0 µm, the average length thereof was 30 mm, the average depth thereof was 0.5 µm, the average pitch thereof was 18.84 µm, the standard deviation of the pitches of the ultrafine grooves was 8.29 µm, the standard deviation of the depths of the ultrafine grooves was 0.56 µm, and the arithmetic average roughness (Ra) in the direction perpendicular to the orientation of the ultrafine grooves was 0.30 µm. FIG. 21 is a partial enlarged photograph of a plane surface of the base film of No. 3.

No. 4

A sheet body having an average thickness of 75 µm was formed by using a resin similar to the resin used in No. 1. Then, ultrafine grooves were formed on one face of the sheet body by using a cutting tool, whereby a base film was produced. Subsequently, a light diffusion layer containing beads and a binder similar to those used in No. 1 was laminated on the face of the base film provided with the ultrafine grooves, whereby the light diffusion sheet of No. 4 was obtained. As to the light diffusion sheet, the average width of the ultrafine grooves was 32.7 µm, the average depth thereof was 28.1 µm, the average pitch thereof was 31.5 µm, the standard deviation of the pitches of the ultrafine grooves was 9.73 µm, the standard deviation of the depths of the ultrafine grooves was 0.89 µm, and the arithmetic average roughness (Ra) in the direction perpendicular to the orientation of the ultrafine grooves was 4.30 µm.

No. 5

The light diffusion sheet of No. 5 was obtained as in No. 1, except that the ultrafine grooves were not formed.

The properties of the light diffusion sheets of No. 1 to No. 5 are shown in Table 1.

TABLE 1

|  | Average Thickness of Base Film (µm) | Difference in Refractive Index between Base Film and Binder | Ultrafine Grooves | | | | | | Arithmetic Average Roughness (Ra) in Direction Perpendicular to Orientation of Ultrafine Grooves (µm) |
| --- | --- | --- | --- | --- | --- | --- | --- | --- | --- |
|  |  |  | Average Width (µm) | Average Length (mm) | Average Depth (µm) | Average Pitch (µm) | Standard Deviation of Pitches (µm) | Standard Deviation of Depths (µm) |  |
| No. 1 | 75 | 0.09 | 9.3 | — | 2.8 | 9.3 | 6.54 | 1.13 | 1.34 |
| No. 2 | 75 | 0.09 | 26.9 | — | 6.44 | 26.9 | 5.56 | 2.38 | 0.92 |
| No. 3 | 75 | 0.09 | 1.0 | 30 | 0.5 | 18.84 | 8.29 | 0.56 | 0.30 |
| No. 4 | 75 | 0.09 | 32.7 | — | 28.1 | 31.5 | 9.73 | 0.89 | 4.30 |
| No. 5 | 75 | 0.09 | — | — | — | — | — | — | — |

Examples 1 to 5

Figure 22:
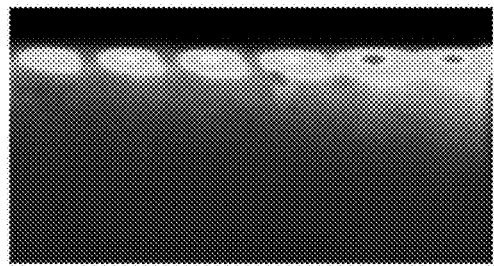
FIG. 22 is a photograph of a side face of the light diffusion sheet of No. 1 according to Example 1.

The light diffusion sheet of No. 1 was laminated on a front face side of a light guide film of an edge-lit backlight unit that included LED light sources and was to be included in a liquid crystal display device in such a manner that the average orientation of the ultrafine grooves with respect to the average direction of the rays of light emitted by the LED light sources and incident on the light guide film was directed at an angle shown in Table 2. FIG. 22 is a photograph of a side face of the light diffusion sheet of No. 1 according to Example 1.

Examples 6 to 10

The light diffusion sheet of No. 2 was laminated on a front face side of a light guide film of an edge-lit backlight unit that included LED light sources and was to be included in a liquid crystal display device in such a manner that the average orientation of the ultrafine grooves with respect to the average direction of the rays of light emitted by the LED light sources and incident on the light guide film was directed at an angle shown in Table 2.

Examples 11 to 15

The light diffusion sheet of No. 3 was laminated on a front face side of a light guide film of an edge-lit backlight unit that included LED light sources and was to be included in a liquid crystal display device in such a manner that the average orientation of the ultrafine grooves with respect to the average direction of the rays of light emitted by the LED light sources and incident on the light guide film was directed at an angle shown in Table 2.

Examples 16 to 20

The light diffusion sheet of No. 4 was laminated on a front face side of a light guide film of an edge-lit backlight unit that included LED light sources and was to be included in a liquid crystal display device in such a manner that the average orientation of the ultrafine grooves with respect to the average direction of the rays of light emitted by the LED light sources and incident on the light guide film was directed at an angle shown in Table 2.

Comparative Example

Figure 23:
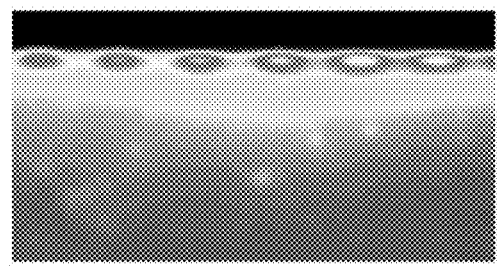
FIG. 23 is a photograph of a side face of the light diffusion sheet of No. 5 according to Comparative Example.

The light diffusion sheet of No. 5 was laminated on a front face side of a light guide film of an edge-lit backlight unit that included LED light sources and was to be included in a liquid crystal display device. FIG. 23 is a photograph of a side face of the light diffusion sheet of No. 5 according to Comparative Example.

Half-Value Angle

For each of Examples 1 to 20 and Comparative Example, a half-value angle associated with the face luminance of the light diffusion sheet was measured by using "EzContrast" available from ELDIM. The results of the measurement are shown in Table 2.

Lack in Uniformity of Luminance

The backlight unit of each of Examples 1 to 20 and Comparative Example was installed in the liquid crystal display device, and then the image displayed on the liquid crystal display device was observed. The presence or absence of the lack in uniformity of luminance was determined by a visual observation, and evaluations were made in accordance with the following criteria.

A: The lack in uniformity of luminance was not visible at all.

B: When the image was observed carefully, the lack in uniformity was slightly visible in the vicinity of the light sources in a planar view.

C: Even when the image was observed less carefully, the lack in uniformity of luminance was slightly visible in the vicinity of the light sources in a planar view.

D: Even when the image was observed less carefully, the lack in uniformity of luminance was visible.

TABLE 2

| | Average Orientation of Ultrafine Grooves with Respect to Average Direction of Rays of Light Emitted by LED Light Sources | Half-Value Angle (°) | | Lack in Uniformity of Luminance |
|---|---|---|---|---|
| | | Direction Parallel to Rays of Light White Light | Direction Perpendicular to Rays of Light White Light | |
| Example 1 | 0° | 10 | 50 | A |
| Example 2 | 15° | 10 | 50 | A |
| Example 3 | 20° | 15 | 45 | A |
| Example 4 | 30° | 25 | 35 | B |
| Example 5 | 45° | 29 | 31 | C |
| Example 6 | 0° | 10 | 50 | A |
| Example 7 | 15° | 10 | 50 | A |
| Example 8 | 20° | 12 | 47 | A |
| Example 9 | 30° | 28 | 35 | B |
| Example 10 | 45° | 29 | 31 | C |
| Example 11 | 0° | 20 | 40 | A |
| Example 12 | 15° | 22 | 36 | A |
| Example 13 | 20° | 25 | 35 | B |
| Example 14 | 30° | 28 | 32 | B |
| Example 15 | 45° | 29 | 31 | C |
| Example 16 | 0° | 8 | 52 | A |
| Example 17 | 15° | 8 | 52 | A |
| Example 18 | 20° | 12 | 47 | A |
| Example 19 | 30° | 27 | 33 | B |
| Example 20 | 45° | 29 | 31 | C |
| Comparative Example | — | 30 | 30 | D |

Evaluation Results

As shown in Table 2, it was revealed that the half-value angle associated with the luminance in the direction perpendicular to the rays of light emitted by the LED light sources in each of Examples 1 to 20, in which the average orientation of the ultrafine grooves with respect to the average direction of the rays of light emitted by the LED light sources and incident on the light guide film was directed at an angle of 45° or less, was greater than the half-value angle measured in Comparative Example, and thus the lack in uniformity of luminance was likely to be inhibited. It was also revealed that the half-value angle associated with the luminance in the direction perpendicular to the rays of light emitted by the LED light sources increased as the average angle at which the ultrafine grooves were oriented decreased, and thus the lack in uniformity of luminance was likely to be inhibited. Furthermore, it was revealed that Examples 1 to 5 in which the ultrafine grooves were formed by using the mold, Examples 6 to 10 in which the ultrafine grooves were formed by laser processing, Examples 16 to 20 in which the ultrafine grooves were formed by using a cutting tool, enabled formation of more desirable ultrafine grooves as compared to Examples 11 to 15 in which the ultrafine grooves were formed by filing, and that the more desirable fine grooves yielded a greater half-value angle associated with the luminance in the direction perpendicular to the rays of light emitted by the LED light sources, and the lack in uniformity of luminance was likely to be inhibited accordingly. In addition, as shown in FIGS. 22 and 23, it was revealed that the light diffusion sheet of Example 1 inhibited the creation of hot spots caused by the LED light sources to a greater extent than the light diffusion sheet of Comparative Example.

INDUSTRIAL APPLICABILITY

As described in the foregoing, the optical sheet for a backlight unit and the backlight unit according to the embodiments of the present invention are capable of inhibiting the creation of hot spots, and are thus suited for use in various types of liquid crystal display devices such as high-quality transmissive liquid crystal display devices.

EXPLANATION OF THE REFERENCE SYMBOLS 1 light guide film
2, 82 LED light source
3 optical sheet
4, 24, 34, 44, 54, 64, 74 underlayer light diffusion sheet
5 first prism sheet
6 second prism sheet
7 upper-layer light diffusion sheet
8 reflection sheet
11, 25, 35 base film
12, 36, 45 light diffusion layer
13, 26, 37, 75 protective layer
14, 38, 46 bead
15, 39, 47 binder
16, 27, 40, 48, 76, 86 ultrafine groove
17 recessed portion
18 raised portion
101 edge-lit backlight unit
102 light source
103 light-guiding sheet
104 optical sheet
105 reflection sheet
106 underlayer light diffusion sheet
107 prism sheet
108 upper-layer light diffusion sheet

The invention claimed is:

1. A light diffusion sheet for a backlight unit for a liquid crystal display device, the light diffusion sheet being for guiding toward a front face side rays of light emitted by an LED light source, wherein
the light diffusion sheet comprises a plurality of resin layers,
the plurality of resin layers comprising: a bass film; a light diffusion layer that is laminated on a front face side of the base film and comprises beads and a binder for the beads; and a protective layer laminated on a back face side of the base film, and
ultrafine grooves oriented in specific directions that transmit rays of light in a width direction to inhibit creation of hot spots are provided on a front face side or a back face side of at least one resin layer of the plurality of resin layers.

2. The light diffusion sheet for a backlight unit according to claim 1, wherein an average number of the ultrafine grooves per unit length in a direction perpendicular to an average orientation of the ultrafine grooves is no less than 10/mm and no greater than 10,000/mm.

3. The light diffusion sheet for a backlight unit according to claim 1, wherein a face of the at least one resin layer provided with the ultrafine grooves has an arithmetic average roughness (Ra) in a direction perpendicular to an orientation of the ultrafine grooves being no less than 0.01 μm and no greater than 5 μm.

4. The light diffusion sheet for a backlight unit according to claim 1, wherein the ultrafine grooves constitute a diffraction grating.

5. The light diffusion sheet for a backlight unit according to claim 1, wherein the ultrafine grooves are provided on a back face side of the protective layer.

6. The light diffusion sheet for a backlight unit according to claim 1, further comprising a functional layer comprising projections and recesses provided on a front face thereof.

7. The light diffusion sheet for a backlight unit according to claim 1, wherein
one resin layer of the one or more resin layers comprises ultrafine projections and recesses on a front face thereof, and
the ultrafine grooves are provided on a face of the one resin layer provided with the ultrafine projections and recesses.

8. A backlight unit for a liquid crystal display device comprising:
a light guide film or a light guide plate for guiding toward a front face side thereof rays of light having entered from an end face side thereof;
one or more LED light sources that are disposed on the end face side of the light guide film or the light guide plate and are for emitting rays of light to an end face of the light guide film or the light guide plate; and
the light diffusion sheet according to claim 1 overlaid on the front face side of the light guide film or the light guide plate.

9. The backlight unit for a liquid crystal display device according to claim 8, wherein the light diffusion sheet is overlaid directly on a front face of the light guide film or the light guide plate.

10. The backlight unit according to claim 8, wherein in a planar view, an average orientation of the ultrafine grooves of the light diffusion sheet with respect to an average direction of the rays of light emitted by the one or more LED light sources and incident on the light guide film or the light guide plate is directed at an angle within a range of −45° to 45°.

* * * * *